United States Patent
Damman et al.

(10) Patent No.: US 10,127,325 B2
(45) Date of Patent: Nov. 13, 2018

(54) AMPLIFICATION OF A SOCIAL OBJECT THROUGH AUTOMATIC REPUBLISHING OF THE SOCIAL OBJECT ON CURATED CONTENT PAGES BASED ON RELEVANCY

(71) Applicant: Livefyre, Inc., San Francisco, CA (US)

(72) Inventors: Xavier Damman, San Francisco, CA (US); Burt Herman, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 376 days.

(21) Appl. No.: 14/496,863

(22) Filed: Sep. 25, 2014

(65) Prior Publication Data

US 2015/0012452 A1 Jan. 8, 2015

Related U.S. Application Data

(63) Continuation of application No. 13/854,145, filed on Apr. 1, 2013, now abandoned, and a continuation of
(Continued)

(51) Int. Cl.
*G06F 17/00* (2006.01)
*G06F 17/30* (2006.01)
(Continued)

(52) U.S. Cl.
CPC .... *G06F 17/30876* (2013.01); *G06F 17/2247* (2013.01); *G06F 17/30997* (2013.01);
(Continued)

(58) Field of Classification Search
CPC ......... G06F 17/30997; G06F 17/30876; G06F 17/2247
See application file for complete search history.

(56) References Cited

U.S. PATENT DOCUMENTS 5,826,025 A * 10/1998 Gramlich ............... G06F 17/241
709/217
6,983,273 B2 * 1/2006 Banerjee ........... G06F 17/30864
(Continued)

FOREIGN PATENT DOCUMENTS

WO WO2008121377 A2 10/2008

OTHER PUBLICATIONS

ContentRobot, "How to Use Bloglines to Subscribe to News Feeds", p. 1-5, published online as of Mar. 7, 2006).*
(Continued)

*Primary Examiner* — William L Bashore
*Assistant Examiner* — David Faber
(74) *Attorney, Agent, or Firm* — Brake Hughes Bellermann LLP

(57) ABSTRACT

A method, an apparatus and/or a system of amplification of a social object through automatic republishing of the social object on curated content pages based on relevancy is disclosed. A curated content system involves associating a social media account of a user of a third-party service to the curated content system based on an authentication of the social media account through the curated content system. The curated content system may also involve determining that a social object placed in the third-party service is associated with a page in the curated content system based on a relevancy match between an identification data associated with the social object with at least a portion of a content of the page. Further, the curated content system involves automatically republishing the social object adjacent to at least the portion of the content of the page using a processor to amplify an influence of the social object.

10 Claims, 22 Drawing Sheets

Related U.S. Application Data application No. 13/462,663, filed on May 2, 2012, now Pat. No. 8,843,543, and a continuation of application No. 13/296,525, filed on Nov. 15, 2011, now abandoned, and a continuation of application No. 13/156,368, filed on Jun. 9, 2011, now Pat. No. 8,082,486.

(51) Int. Cl.
*G06F 17/22* (2006.01)
*H04N 21/254* (2011.01)
*H04N 21/8352* (2011.01)
*G06Q 50/00* (2012.01)

(52) U.S. Cl.
CPC ......... *G06Q 50/01* (2013.01); *H04N 21/2541* (2013.01); *H04N 21/8352* (2013.01)

(56) References Cited

U.S. PATENT DOCUMENTS

| | | | | |
|---|---|---|---|---|
| 7,760,684 B2* | 7/2010 | Kadar | ............... | H04L 29/06027 370/328 |
| 8,073,850 B1* | 12/2011 | Hubbard | ................ | G06Q 30/02 705/14.52 |
| 8,190,711 B1* | 5/2012 | Borodich | .......... | G06F 17/30876 705/20 |
| 8,209,333 B2* | 6/2012 | Hubbard | ................ | G06Q 30/02 705/14.52 |
| 8,499,073 B1* | 7/2013 | Gandhi | ................... | H04L 67/22 709/223 |
| 8,832,188 B1* | 9/2014 | Cierniak | ................ | H04L 51/32 709/204 |
| 8,868,662 B2* | 10/2014 | Curtin | .................... | G06F 17/30 707/600 |
| 2002/0026327 A1* | 2/2002 | Kothari | .................. | G06F 21/10 715/273 |
| 2002/0116293 A1* | 8/2002 | Lao | ..................... | G06F 17/3089 705/27.1 |
| 2005/0060166 A1* | 3/2005 | Durham | ................ | G06Q 30/02 705/1.1 |
| 2006/0218492 A1* | 9/2006 | Andrade | ................ | G06F 17/24 715/234 |
| 2006/0282328 A1* | 12/2006 | Gerace | ............. | G06F 17/30867 705/14.66 |
| 2007/0180523 A1* | 8/2007 | Jablonski | ................ | G06F 21/10 726/22 |
| 2007/0191040 A1* | 8/2007 | Kadar | ............... | H04L 29/06027 455/466 |
| 2008/0021783 A1* | 1/2008 | Varghese | ............... | G06Q 20/10 705/14.7 |
| 2008/0033776 A1* | 2/2008 | Marchese | ............. | G06Q 20/10 705/7.33 |
| 2008/0060013 A1* | 3/2008 | Sarukkai | ........... | G06F 17/30781 725/46 |
| 2008/0155080 A1* | 6/2008 | Marlow | .................. | H04L 12/66 709/223 |
| 2008/0240490 A1* | 10/2008 | Finkelstein | .......... | H04N 21/235 382/100 |
| 2009/0177588 A1* | 7/2009 | Marchese | ............. | G06Q 30/02 705/80 |
| 2010/0042652 A1* | 2/2010 | O'Donnell | ........... | G06F 21/105 726/26 |
| 2010/0318611 A1* | 12/2010 | Curtin | ..................... | G06F 15/16 709/206 |
| 2011/0016104 A1* | 1/2011 | Leconte | ........... | G06F 17/30699 707/706 |
| 2011/0023127 A1* | 1/2011 | O'Donnell | .............. | G06F 21/10 726/26 |
| 2011/0191416 A1* | 8/2011 | Glazer | .................... | G06Q 10/06 709/204 |
| 2011/0239103 A1* | 9/2011 | Mercuri | ............ | G06F 17/30861 715/234 |
| 2011/0282943 A1* | 11/2011 | Anderson | ............... | G06Q 10/06 709/204 |
| 2011/0302152 A1* | 12/2011 | boyd | ................. | G06F 17/30867 707/722 |
| 2012/0102383 A1* | 4/2012 | Liu | ....................... | G06F 17/215 715/202 |
| 2012/0226521 A1* | 9/2012 | Bosworth | .............. | G06Q 30/02 705/7.32 |
| 2012/0232998 A1* | 9/2012 | Schoen | ................... | G06Q 10/10 705/14.66 |
| 2013/0018893 A1* | 1/2013 | Nelson | ................... | G06Q 30/02 707/748 |
| 2013/0024519 A1* | 1/2013 | Herman | ............. | G06F 17/30997 709/204 |
| 2013/0030905 A1* | 1/2013 | Fuloria | ................... | G06Q 50/01 705/14.39 |
| 2013/0036171 A1* | 2/2013 | Gilbert | ................... | G06Q 50/01 709/204 |
| 2015/0220219 A1* | 8/2015 | Wetherell | ............ | G06F 17/3089 715/716 |

OTHER PUBLICATIONS

Slashdot.org, "Slashdot: News for nerds, stuff that matters", available as of Aug. 1, 2007 through Wayback Machine, pp. 1-9 https://web.archive.org/web/20070801215004/http://slashdot.org/.*

* cited by examiner

| FIRST PUBLISHER 114 | ORIGINAL CONTENT 110 | SUBSEQUENT PUBLISHERS 116 | OTHER WORK OF AUTHORSHIP 112 | POSTED CONTENT 502 |
|---|---|---|---|---|
| JACK | TWITTER POST 404 | JANE | YOUTUBE VIDEO AND TWITTER POST (JACK) | TWITTER POST + JACK |
| JOHN | FACEBOOK POST 402, TWITTER POST 404 | JILL | FACEBOOK AND TWITTER POST (JOHN) AND YOUTUBE VIDEO | FACEBOOK AND TWITTER POST (JOHN) + JOHN |
| ADAM | YOUTUBE VIDEO 504 | ASHLEY | WEB PAGE, ADAM'S YOUTUBE VIDEO, AND ASHLEY'S FACEBOOK POST | YOUTUBE VIDEO (ADAM'S) + ADAM |
| ASH | FACEBOOK POST 402 | ALICE | TWITTER POST, ASH'S FACEBOOK POST + YOUTUBE VIDEO | ASH'S FACEBOOK POST + ASH |
| • • • | • • • | • • • | • • • | • • • |

TABLE VIEW 500

AMPLIFICATION OF A SOCIAL OBJECT THROUGH AUTOMATIC REPUBLISHING OF THE SOCIAL OBJECT ON CURATED CONTENT PAGES BASED ON RELEVANCY

BENEFIT CLAIM

This application claims benefit under 35 U.S.C. § 120 as a Continuation of application Ser. No. 13/854,145, filed Apr. 1, 2013, the entire contents of which are hereby incorporated by reference as if fully set forth herein. The applicants hereby rescind any disclaimer of claim scope in the parent application or the prosecution history thereof and advise the USPTO that the claims in this application may be broader than any claim in the parent application.

FIELD OF TECHNOLOGY

This application relates generally to the use of a web-based technology to turn an online communication into an interactive dialogue around curated pages serving as virtual scrapbook Rages, such as in a social media environment, and in one exemplary embodiment, to the amplification of a social object through automatic republishing of the social object on curated content pages based on relevancy.

BACKGROUND

Attracting, building, and maintaining an audience (e.g., customers, voters, constituents, stakeholders) in a connected world may mean that an organization (e.g., a business, a fundraising committee of a politician, a school, etc.) may need to actively engage their core audience through social media channels on a frequent basis. As such, the organization may create a Twitter®, Facebook®, Instagram®, and/or Storify® account to engage with their audience and discuss topics relevant to both the organization and to interests of the audience generally. For example, the organization may sometimes send a message through the social media channels about a recent news event that might be followed by the audience.

Sometimes, the message may be republished through a particular social media channel based on a hash tag match and/or a real time syndication service. However, the message may not be intelligently displayed in locations where the message may have resonance with an interest level attribute based on contextual relevancy to a social media page having user curated content. As such, the organization may need to spend extensively on figuring out which keywords to bid on, designing advertisements, determining geo-fenced boundaries, etc. to reach a significant portion of the audience it desires to communicate with. The overhead required to manage paid search spending by the organization may be unsustainable and therefore a large market segment of the audience may remain untapped.

SUMMARY

Disclosed is a method, system, and apparatus of a web-based technology to turn an online communication into an interactive dialogue around curated pages serving as virtual scrapbook pages, such as in a social media environment, and in one exemplary embodiment, to the creation, distribution, and publication of sharable scrapbook pages through source attribution of embedded content.

In one aspect, a method of a curated content system involves associating a social media account of a user of a third-party service to the curated content system based on an authentication of the social media account through the curated content system. Further, the method of the curated content system involves determining that a social object placed in the third-party service is associated with a page in the curated content system based on a relevancy match between an identification data associated with the social object with at least a portion of a content of the page. The method of the curated content system also involves automatically republishing the social object adjacent to at least the portion of the content of the page using a processor to amplify an influence of the social object.

The page associated with the curated content system may be created by a different user of the curated content system through a clipping action and/or a reposting action of various other social objects arranged in the page.

The method of the curated content system may involve automatically calculating an estimated branding value based on the republishing of the social object adjacent to at least the portion of the content of the page. Further, the method of the curated content system may involve measuring an interaction with the social object adjacent to at least the portion of the content of the page. The method of the curated content system may also involve debiting a financial account associated with the user of the third-party service based on the interaction.

The interaction may be a click-through action on the social object in the page of the curated content system, a "like" action on the social object in the page of the curated content system, the reposting action applied to the social object in the page of the curated content system, and/or a commenting action associated with the with the social object in the curated content system.

The method of the curated content system may involve promoting the social object in various pages of the curated content system based on a budget of the user of the third party system, wherein a number of pages in which the social object is republished is proportional to the budget of the user of the third party system. Further, the method of the curated content system may involve automatically amplifying the social object through the promotion of the social object in various pages of the curated content system.

The social object may be a news item of a commercial enterprise seeking to create an awareness around a brand of the commercial enterprise; a viewpoint commentary item expressed by an individual promoter wherein the individual promoter is an advocate of a viewpoint comprising a political viewpoint, a social viewpoint, a community viewpoint, and/or a personal viewpoint; and/or a social commentary item expressed by the commercial enterprise and/or the individual promoter seeking to create an awareness around the brand of the commercial enterprise and/or the individual promoter.

In one aspect, the method of the curated content system may involve generating an identification meta-data to be associated with an original content of a first publisher that originates in a third-party source server of a public wide area network such that the original content may be attributable to the first publisher through the identification meta-data associated thereto with the original content when the original content having the associated identification meta-data is republished on the page along with other republished data assets in a curated form on the page by a subsequent publisher, and wherein the page is a scrapbook page. Further, the method of the curated content system may involve determining that a subsequent publishing of the original content is an embedded portion of an other work of authorship when a communication of the identification meta-data is extracted from a server in which the subsequent publishing is manifested and transmitted from the server to the processor. The method of the curated content system may also involve automatically generating a communication having an identity data of a subsequent publisher and/or a temporal data associated with the subsequent publishing that is transmitted to the first publisher of the original content when the other work of authorship is published with the embedded portion having the original content.

The method of the curated content system may involve providing a financial incentive to the first publisher proportional to an aggregate number of views, a unique visitor count, a bounce rate, a social sharing rate, and/or a commenting rate, associated with subsequent publishing of the original content in the other work of authorship. The other work of authorship may be a separately copyrightable work of authorship comprising its own content in addition to leveraged and attributed content from disparate media sources.

The third-party source of the public wide area network may be a social network-based publication system (e.g. a short messaging system, Instagram®, Facebook®, Pinterest®, a blog, and an other media creation platform) that is monitored by the subsequent publisher through a leveraged content server in which the other work of authorship is compiled prior to publishing. The leveraged content server may automatically format the other work of authorship to be optimally displayed in a plurality of multimedia types including print, video, a type that is able to be displayed on a tablet, and/or types that are able to display online news, and/or a blog.

Each embedded instance of the original content of the first publisher in the other work of authorship may be interactive directly through a location where the other work of authorship is published in a manner in which a click-through on the embedded portion of the other work of authorship may transport a navigation pane presently comprising a particular republishing of the original content to the social network-based publication system in which the original content is first published by the first publisher.

The leveraged content server may automatically determine which original content is trusted in the public wide area network based on republishing history associated with the original content contributions of the first publisher and other first publishers, and which may algorithmically present preferred content to subsequent publishers based on a criteria including a popularity of republishing of the original content and a credibility scoring of the first publisher and other publishers that is determined based on an algorithmic page rank of republished destinations and originated sources of the original content. The determination based on the algorithmic page rank of the republished destinations and originated sources of the original content may also consider a rating score assessed to original content and first publishers in the leveraged content server such that all subsequent publishers may have access privileges to access ratings and associated comments provided by peer subsequent publishers.

In another aspect, the curated content system includes a linking module to associate a social media account of a user of a third-party service to the curated content system based on an authentication of the social media account through the curated content system. Further, the curated content system includes a tracking module configured to determine that a social object placed in the third-party service is associated with a page in the curated content system based on a relevancy match between an identification data associated with the social object with at least a portion of a content of the page. The curated content system also includes a republishing module configured to automatically republish the social object adjacent to at least the portion of the content of the page using a processor.

The page associated with the curated content system associated may be created by a different user of the curated content system through at least one of a clipping action and a reposting action of various other social objects arranged in the page.

The curated content system may include a budget-advertising module to automatically calculating an estimated branding value based on the republishing of the social object adjacent to at least the portion of the content of the page. Further, the curated content system may include an interaction module to automatically measure an interaction with the social object adjacent to at least the portion of the content of the page. The curated content system may also include a finance module to debit a financial account associated with the user of the third-party service based on the interaction.

The interaction may be a click-through action on the social object in the page of the curated content system, a "like" action on the social object in the page of the curated content system, the reposting action applied to the social object in the page of the curated content system, and/or a commenting action associated with the social object in the curated content system.

The curated content system may include a promotion module to promote the social object in various pages of the curated content system based on a budget of the user of the third party system, wherein a number of pages in which the social object is republished is proportion to the budget of the user of the third party system.

The social object may be a news item of a commercial enterprise seeking to create an awareness around a brand of the commercial enterprise; a viewpoint commentary item expressed by an individual promoter, wherein the individual promoter is an advocate of a viewpoint comprising a political viewpoint, a social viewpoint, a community viewpoint, and/or a personal viewpoint; and/or a social commentary item expressed by the commercial enterprise and/or the individual promoter seeking to create an awareness around the brand the commercial enterprise and/or the individual promoter.

The curated content system may include the tracking module to also generate an identification meta-data to be associated with an original content of a first publisher that originates in a third-party source server of a public wide area network such that the original content may be attributable to the first publisher through the identification meta-data associated thereto with the original content when the original content having the associated identification meta-data is republished on a scrapbook page along with other republished data assets in a curated form on the scrapbook page by a subsequent publisher.

The curated content system may include a processor communicatively coupled with a non-transitory memory which may be configured to determine that a subsequent publishing of the original content is an embedded portion of the other work of authorship when a communication of the identification meta-data is extracted from a server in which the subsequent publishing is manifested and transmitted from the server to the processor. Further, the curated content system may include a notification module to automatically generate a communication having an identity data of a subsequent publisher and/or a temporal data associated with the subsequent publishing that may be transmitted to the first publisher of the original content when the other work of authorship is published with the embedded portion having the original content.

The curated content system may include a transaction module to provide a financial incentive to the first publisher proportional to an aggregate number of views, a unique visitor count, a bounce rate, a social sharing rate, and/or a commenting rate, associated with subsequent publishing of the original content in the other work of authorship. The other work of authorship may be a separately copyrightable work of authorship comprising its own content in addition to leveraged and attributed content from disparate media sources.

The third-party source of the public wide area network may be the social network-based publication system that may be monitored by the subsequent publisher through a leveraged content server in which the other work of authorship may be compiled prior to publishing. The leveraged content server may automatically format the other work of authorship to be optimally displayed in a plurality of multimedia types including print, video, a type that is able to be displayed on a tablet, and/or types that are able to display online news, and/or a blog.

Each embedded instance of the original content of the first publisher in the other works of authorship may be interactive directly through a location where the other work of authorship is published in a manner in which a click-through on the embedded portion of the other work of authorship may transport a navigation pane presently comprising a particular republishing of the original content to the social network-based publication system in which the original content is first published by the first publisher.

The leveraged content server may automatically determine which original content is trusted in the public wide area network based on republishing history associated with the original content contributions of the first publisher and other first publishers, and which may algorithmically present preferred content to subsequent publishers based on a criteria including a popularity of republishing of the original content and a credibility scoring of the first publisher and other publishers that may be determined based on an algorithmic page rank of republished destinations and originated sources of the original content. The determination based on the algorithmic page rank of republished destinations and originated sources of the original content also may consider a rating score assessed to original content and first publishers by subsequent publishers who provide this rating score of original content and first publishers in the leveraged content server such that all subsequent publishers may have access privileges to access ratings and associated comments provided by peer subsequent publishers.

In yet another aspect, a method of a curated content system involves associating a social media account of a user of a third-party service to the curated content system based on an authentication of the social media account through the curated content system. Further, the method of the curated content system also involves determining that a social object placed in the third-party service is associated with a page in the curated content system based on a relevancy match between an identification data associated with the social object with at least a portion of a content of the page. The method of the curated content system also involves promoting the social object in various pages of the curated content system based on a budget of the user of the third party system, wherein a number of pages in which the social object is republished is proportion to the budget of the user of the third party system.

The page associated with the curated content system may be created by a different user of the curated content system through a clipping action and/or a reposting action of various other social objects arranged in the page.

The method of the curated content system may involve automatically calculating an estimated branding value based on a republishing of the social object adjacent to at least the portion of the content of the page. Further, the method of the curated content system may involve measuring an interaction with the social object adjacent to at least the portion of the content of the page. The method of the curated content system may also involve debiting a financial account associated with the user of the third-party service based on the interaction.

The method of the curated content system may involve automatically amplifying the social object through the promotion of the social object in various pages of the curated content system. The method of the curated content system may also involve automatically republishing the social object adjacent to at least the portion of the content of the page using a processor. The interaction may be a click-through action on the social object in the page of the curated content system, a "like" action on the social object in the page of the curated content system, the reposting action applied to the social object in the page of the curated content system, and/or a commenting action as associated with the social object in the curated content system. The social object may be a news item of a commercial enterprise seeking to create an awareness around a brand of the commercial enterprise; a viewpoint commentary item expressed by an individual promoter, wherein the individual promoter may be an advocate of a viewpoint comprising a political viewpoint, a social viewpoint, a community viewpoint, and/or a personal viewpoint; and/or a social commentary item expressed by the commercial enterprise and/or the individual promoter seeking to create an awareness around the brand of the commercial enterprise and/or the individual promoter.

The method of the curated content system may involve generating an identification meta-data to be associated with an original content of a first publisher that originates in a third-party source server of a public wide area network such that the original content is attributable to the first publisher through the identification meta-data associated thereto with the original content when the original content having the associated identification meta-data is republished on the page along with other republished data assets in a curated form on the page by a subsequent publisher, and wherein the page is a scrapbook page.

The method of the curated content system may involve determining that a subsequent publishing of the original content is an embedded portion of the other work of authorship when a communication of the identification meta-data is extracted from a server in which the subsequent publishing is manifested and transmitted from the server to the processor. Further, the method of the curated content system may involve automatically generating a communication having an identity data of a subsequent publisher and/or a temporal data associated with the subsequent publishing that may be transmitted to the first publisher of the original content when the other work of authorship is published with the embedded portion having the original content.

The method of the curated content system may involve providing a financial incentive to the first publisher proportional to an aggregate number of views, unique visitor count, bounce rate, social sharing rate, and/or commenting rate, associated with subsequent publishing of the original content in the other work of authorship. The other work of authorship may be a separately copyrightable work of authorship comprising its own content in addition to leveraged and attributed content from disparate media sources.

The third-party source of the public wide area network may be the social network-based publication system that may be monitored by the subsequent publisher through a leveraged content server in which the other work of authorship may be compiled prior to publishing. The leveraged content server may automatically format the other work of authorship to be optimally displayed in a plurality of multimedia types including print, video, a type that is able to be displayed on a tablet, and/or types that are able to display online news, and/or a blog.

Each embedded instance of the original content of the first publisher in the other works of authorship may be interactive directly through a location where the other work of authorship is published in a manner in which a click-through on the embedded portion of the other work of authorship may transport a navigation pane presently comprising a particular republishing of the original content to the social network-based publication system in which the original content is first published by the first publisher.

The leveraged content server may automatically determine which original content is trusted in the public wide area network based on a republishing history associated with the original content contributions of the first publisher and other first publishers, and which may algorithmically present preferred content to subsequent publishers based on a criteria including a popularity of republishing of the original content and a credibility scoring of the first publisher and other publishers that may be determined based on an algorithmic page rank of republished destinations and originated sources of the original content. The determination based on the algorithmic page rank of republished destinations and originated sources of the original content may also consider a rating score assessed to original content and first publishers by subsequent publishers who provide this rating score of original content and first publishers in the leveraged content server such that all subsequent publishers have access privileges to access ratings and associated comments provided by peer subsequent publishers The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5 illustrates a table view, according to one or more embodiments.

Figure 1:
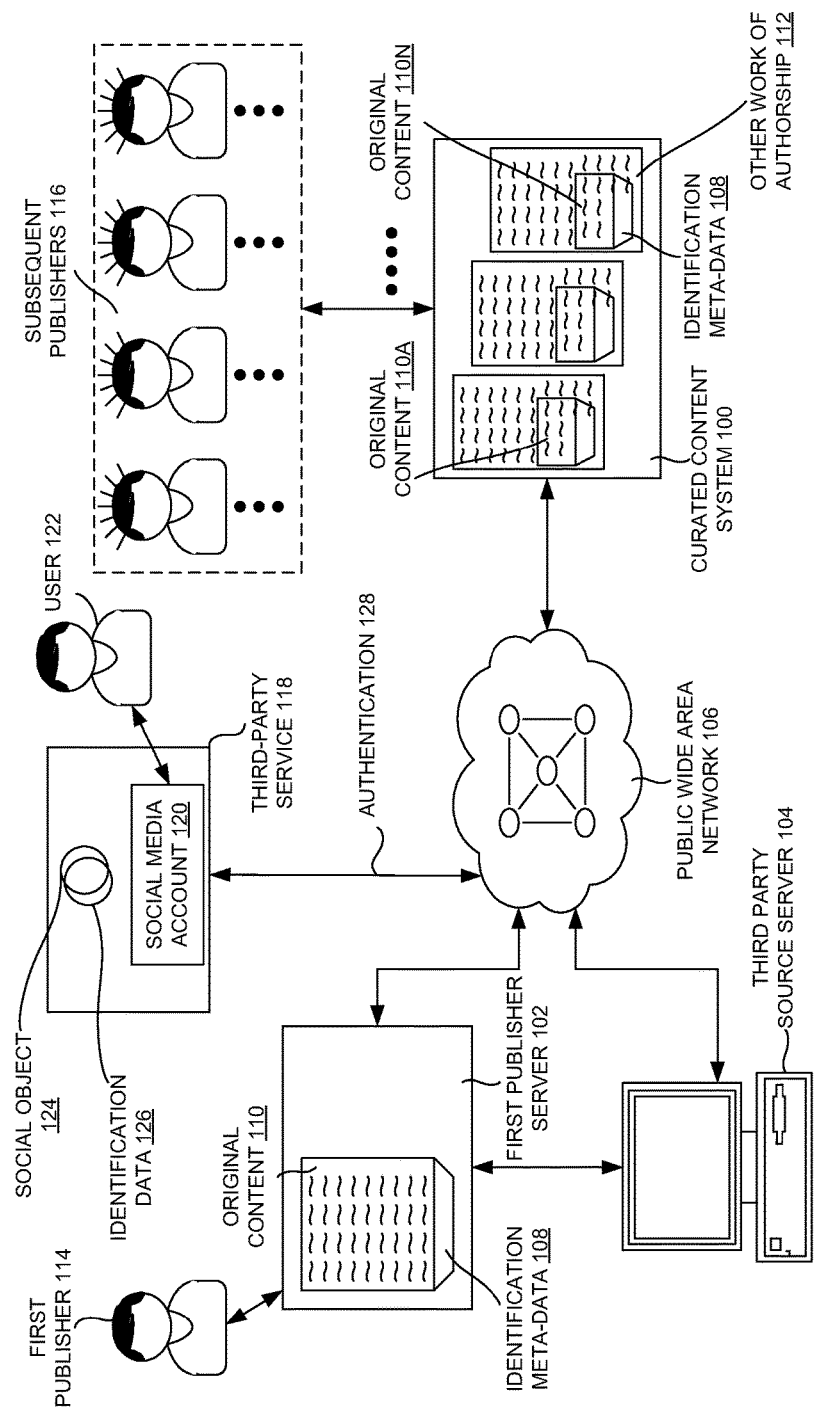
FIG. 1 is a schematic view of a public wide area network and a first publisher server according to one or more embodiments.

Other features of the present embodiments will be apparent from the accompanying drawings and from the detailed description.

DETAILED DESCRIPTION

Disclosed are a method, an apparatus and/or a system of amplification of a social object through automatic republishing of the social object on curated content pages based on relevancy. Although the present embodiments have been described with reference to specific example embodiments, it will be evident that various modifications and changes may be made to these embodiments without departing from the broader spirit and scope of the various embodiments.

Online content and online publishing, as embodied in social media and social networking websites include a group of Internet-based applications that build on the ideological and technological foundations of Web 2.0, which allows for the creation and exchange of user-generated content. Businesses may refer to social media as consumer-generated media (CGM). A common thread running through all definitions of social media is a blending of technology and social interaction for the co-creation of value.

The social story interaction (the way web users engage content) is entering into the consciousness of editors and producers as they think through the outline of a story. It could very well be that we will see more stories that have deep social integration, especially for in-depth and crowd-sourced pieces. Taking social data and conversation and making sense of it will likely become more streamlined and perhaps even more accessible to those besides major news organizations who have the resources to develop such packages.

Social media has a crucial role in the field of online publishing and Internet journalism. Social media may have been integral to the Arab revolutions and revolts of 2011. Activists on the ground in Egypt, Libya, and Iran have used Facebook® to schedule protests, Twitter® to coordinate protests, and YouTube® to tell the world about the protests (including live coverage of some events). Indeed, the uprising of 2009 in Iran was widely coordinated and published using social media websites such as Twitter® due to local government restrictions on mobile communications. It was during this time that the public at large, both in the West and in the Middle East, realized the vast potential of social media to make voices heard and opinions known, which otherwise would have been drowned or subdued due to government censorship or otherwise.

Traditionally, online publishing has been the practice of investigation and reporting of these events, issues, and trends to a broad audience. Although there is much variation within online publishing, the role of publisher has often been inaccessible to the masses. In modern society, news media has become the chief purveyor of information and opinion about public affairs; but the role and status of online publishing, along with other forms of mass media, are undergoing vast changes resulting from the Internet, especially Web 2.0. Therefore, it is no surprise that social media has an important role to play in the future of original content creation for online publishing thereby opening up the doors of online publishing to a wider audience.

Social media technologies provide scale and are capable of reaching a global audience. Social media tools are generally available to the public at little or no cost. Most social media production does not require specialized skills and training, or requires only modest reinterpretation of existing skills (as opposed to traditional print and news publications which may require formal training). In the case of social media based publishing, anyone with access can operate the means of social media production. In addition, social media can be altered almost instantaneously by comments or editing (as opposed to industrial media production).

Therefore, it is not surprising that social networking now accounts for 22% of all time spent online in the United States. A total of 234 million people age 13 or older in the United States used mobile devices in 2009. Twitter® processed more than one billion tweets in December 2009 and averages about 40 million tweets per day. Over 25% of United States internet page views occurred at one of the top social networking sites in December 2009, up from 13.8% a year before. The number of social media users age 65 and older grew 100% throughout 2010, so that one in four people in that age group are now part of a social networking website.

More importantly, social media tools are inspiring people and activists across the world to easily publish and share information on a greater scale (especially via online publishing). The future publisher may be more embedded with the community than ever before, and news outlets may build their newsrooms to focus on utilizing the community and may enable its members to be enrolled as certified publishers who create original content. Bloggers may no longer be just bloggers, but may be relied upon as more credible sources worthy of compensation.

Indeed, reporting has always been in some ways a collaborative process between journalists, publishers and their sources. However, social media based online publishing may permit a merger between the source and the content producer. As a result, there is potential for online publishing to take on a collaborative approach where the witness of the news becomes the creator of original content and its publisher. In essence, the community can be a source of the news as well as the audience, because social media makes them both. Social media may provide for a model of participatory publishing where there may be a potential for greater engagement and connection with the community, especially if traditional publishers are open to ceding a degree of editorial control to the community. A collaborative reporting environment may be created by enlisting a community of bloggers into the news gathering and production process.

FIG. 1 illustrates a network view according to one exemplary embodiment. The network view shows a curated content system 100, a first publisher server 102, a third party source server 104, and a third-party service 118. The first publisher server 102, the third party source server 104, and the third-party service 118 may communicate with a public wide area network 106. Also shown is an identification meta-data 108 which may originate within an original content 110, which in turn may reside within the first publisher server 102. The network view also illustrates an other work of authorship 112, which may be created entirely inside the curated content system 100. Similar to the first publisher server 102, the identification meta-data 108 may originate within the original content 110, which in turn may reside within the other work of authorship 112 (e.g., within the curated content system 100). The curated content system 100 may comprise a number of other works of authorship made up of a corresponding original content 110 and a corresponding identification meta-data 108. In addition, the other work of authorship 112 may be entirely contained and created within the curated content system 100.

FIG. 1 also shows a social media account 120 of a user 122 of the third-party service 118, and an identification data 126 that is associated with a social object 124 within the third-party service 118. The social media account 120 of the user 122 of the third-party service 118 may be associated with the curated content system 100 based on an authentication 128, according to one embodiment. The third-party service 118 may communicate with the curated content system 100 through the public wide area network 106.

In another embodiment, the curated content system 100 may comprise a number of modules to implement specific methods and functions of the present invention. For example, according to one embodiment, the curated content system 100 may contain a curation module 200, a publishing module 202, an authorship module 204, a linking module 206, a tracking module 208, a republishing module 210, a processor 212, a notification module 214, a generation module 216, a transaction module 218, a page rank module 220, a budget advertising module 222, an interaction module 224, a finance module 226, and a promotion module 228. All of the number of modules may communicate with each other independently and may also communicate collectively with the curation module 200, according to one embodiment. The curation module 200 may be thought of as the brain of the curated content system 100, while all of the remaining number of modules may perform a number of tasks in association and conjunction with the curation module 200.

According to one exemplary embodiment, FIG. 1 may show a first publisher 114 and a number of subsequent publishers 116 in addition to the curated content system 100, the first publisher server 102, the third party source server 104, the identification meta-data 108, and the original content 110. It may be appreciated that, at least according to one embodiment, the first publisher 114 may communicate with the first publisher server 102, and similarly, the number of subsequent publishers 116 may communicate with the curated content system 100. In the above mentioned embodiment, the first publisher 114 and the number of subsequent publishers 116 may be a number of distinct entities and/or a number of distinct sources.

According to one embodiment, the curated content system 100 may be a computer server that may perform the functions and methods of the present invention. Particularly, the primary function of the curated content system 100 may be to recognize the original content 110 with the identification meta-data 108 (created in the first publisher server 102 by the first publisher 114) of the original content 110 and to embed the original content 110 (which carries a unique identification meta-data 108) in the other work of authorship 112 (created by the number of subsequent publishers 116). The curated content system 100 may communicate with the third party source server 104 and the first publisher server 102 through the public wide area network 106. In one embodiment, the curated content system 100 may embed the identification meta-data 108 identifying the original content 110 and the first publisher 114 into the other work of authorship 112.

The first publisher server 102 may be a computer server that may track, identify, and gather a plurality of original content 110A-N created by a plurality of first publishers. According to this embodiment, the first publisher server 102 may communicate with the third party source server 104 to aggregate and collect the plurality of original content 110A-N from the plurality of first publishers. The first publisher server 102 may then assign the unique identification meta-data 108 to each of the plurality of original content 110A-N. In one embodiment, the first publisher server 102 may communicate with the third party source server 104 to gather and compile the original content 110.

The third party source server 104 may be a computer server that may store and transmit a data that may be accessed via the Internet (e.g., the public wide area network 106). For example, an Internet social networking website may be the third party source server 104. The third party source server 104 may host a number of Internet websites (e.g., a Facebook® site, a Twitter® site, a YouTube® site, a blog site, a news site, a video site, etc.), and/or an other data resource that may be transmitted over the public wide area network 106, according to one embodiment. The third party source server 104 may also be a source for the original content 110, according to one embodiment. The source for the original content 110 may be the number of Internet websites, each of the number of Internet websites being contained on the third party source server 104.

The curated content system 100, the first publisher server 102, the third party source server 104, and the third-party service 118 may all communicate with each other through the public wide area network 106 (e.g., the Internet). The public wide area network 106 may comprise a number of computer networks as well as a number of specific servers (e.g., the third party source server 104) that may cover a broad area (i.e., may be a network 626 and/or a server with a number of communications that may link and/or cross a metropolitan boundary, a regional boundary, and/or a national boundary), according to one embodiment.

According to another exemplary embodiment, the original content 110 may contain the identification meta-data 108 which may identify the original content 110 as being created by the first publisher 114. The identification meta-data 108 may identify the first publisher 114 as the creator of the original content 110 on the third party source server 104 and available on the public wide area network 106, according to one embodiment. The identification meta-data 108 may contain a structured hidden information that may describe a number of features of the original content 110 (e.g., the name of the creator of the original content 110, the time the original content 110 was created, the location where the original content 110 was created, the IP address from where the original content 110 was created etc.).

According to one embodiment, the identification meta-data 108 may be used to classify and identify a number of specifics regarding the original content 110 (as identified in the examples above). Each of the identification meta-data 108 may specify a property/value pair. A name attribute may identify a property and a content attribute may specify a value of the property (e.g., the name of the first publisher 114 of the original content 110 may be identified as a Facebook® user), according to one embodiment. According to another embodiment, the identification meta-data 108 may be stored in and retrieved from a database and may represent a number of tags and/or a number of titles that may be utilized within a source code of an Internet website (e.g., the Twitter® site and/or the Facebook® site). The identification meta-data 108 may also provide a descriptive information about a context, a quality, a condition, and/or a number of characteristics of an underlying data (e.g., of the original content 110), according to one embodiment. According to another embodiment, the identification meta-data 108 may also include a number of attributes such as a date and a number of time stamps associated with the original content 110.

According to an exemplary embodiment, the original content 110 may be created by the first publisher 114 and placed on the first publisher server 102 which may then be distributed over the public wide area network 106. The original content 110 may be a blog post (e.g., a Wordpress® post, a Blogger® post, etc.), a post on a social networking website (e.g., the Facebook® site, the Twitter® site, etc.), a video post (e.g., a YouTube® post), and/or an other content that may be created by a number of users to be shared across the public wide area network 106. The original content 110 may be created by the first publisher 114 and may contain the identification meta-data 108.

According to one embodiment, the original content 110 may be created entirely within the first publisher server 102. The original content 110 may also be a part of the other work of authorship 112 and may be embedded within the other work of authorship 112 inside the curated content system 100. According to one exemplary embodiment, the original content 110 may be an original work of authorship and may attribute an origination and/or a creation of a particular information (e.g., the blog post) to a specific individual (e.g., the first publisher 114) and/or an entity acting at a particular time. The original content 110 may be protected by a number of copyright laws which may provide the creator of the original content 110 with an exclusive set of rights, including a right to copy, a right to distribute, and/or a right to adapt the original content 110.

Similarly, the other work of authorship 112 may also be protected by the number of copyright laws which may provide the creator of the other work of authorship 112 with the exclusive set of rights, including the right to copy, the right to distribute, and/or the right to adapt the other work of authorship 112. According to an exemplary embodiment, the other work of authorship 112 may be created by the number of subsequent publishers 116 and may be created and compiled in the curated content system 100. The other work of authorship 112 may be embedded with the original content 110, which in turn may contain the identification meta-data 108. According to one embodiment, the other work of authorship 112 may comprise a plurality of textual, audio, video, and/or pictorial components (e.g., a Facebook® post 402, a blog post, a YouTube® video, an audio file, and/or a picture). In addition, the other work of authorship 112 may be created and published by the number of subsequent publishers 116.

The original content 110 may be created by the first publisher 114, and the other work of authorship 112 may be created by the number of subsequent publishers 116. According to one embodiment, the first publisher 114 may be a user of a data related service and/or an Internet website (e.g., the Facebook® site, the Twitter® site, the YouTube® site, the blog site, the news site, the video site, etc.) hosted on the third party source server 104 and transmitted over the public wide area network 106. For example, the first publisher 114 may be a Twitter® user and/or the Facebook® user who may post a message, a Tweet™, and/or a status update. The message, the Tweet™, and/or the status update by the first publisher 114 may be recorded on the third party source server 104 as the original content 110 (e.g., a Twitter® server and/or a Facebook® server) and may be available to the number of subsequent publishers 116 through the public wide area network 106 (e.g., the Internet).

The number of subsequent publishers 116 may then decide to incorporate the original content 110 of the first publisher 114 into the other work of authorship 112, at least according to one exemplary embodiment. Another embodiment may involve the number of subsequent publishers 116 who may publish the other work of authorship 112 which may contain the original content 110 created by the first publisher 114. The number of subsequent publishers 116, like the first publisher 114, may be a number of users of a data related service or an Internet website (e.g., the Facebook® site, the Twitter® site, the YouTube® site, the blog site, the news site, the video site, etc.). In another embodiment, the number of subsequent publishers 116 may create the other work of authorship 112 and may incorporate the original content 110 created by the first publisher 114 and found on the third party source server 104 into the other work of authorship 112. The incorporation of the original content 110 and the compiling of the other work of authorship 112 may occur inside the curated content system 100. The other work of authorship 112 may be accessible on the public wide area network 106, according to one embodiment.

The third-party service 118 may be a computer server that may store and transmit the data that may be accessed via the Internet (e.g., the public wide area network 106). For example, an Internet social networking website may be the third-party service 118. The third-party service 118 may host a number of Internet web sites (e.g., the Facebook® site, the Twitter® site, the YouTube® site, the blog site, the news site, the video site, etc.), and/or an other data resource that may be transmitted over the public wide area network 106, according to one embodiment.

Associated with the third-party service 118 may be a social media account 120. The social media account 120 may be an account associated with the third-party service 118 (e.g. the Facebook® site, the Twitter® site, the YouTube® site, the blog site, the news site, the video site, etc.). The third-party service 118 may communicate with the curated content system 100 through the public wide area network 106 when the social media account 120 is being associated with the curated content system 100 based on an authentication 128 executed by the curated content system 100, according to one embodiment.

According to one embodiment, the social media account 120 of the third-party service 118 may be associated with the curated content system 100 based on the authentication 128 that may be performed by the curated content system 100. In one embodiment, a linking module 206 (see FIG. 2) within the curated content system 100 may perform the authentication 128.

A social object 124 may originate within the third-party service 118, or may be leveraged from an other disparate source by the user 122. The social object 124 may be a news item 1800, a viewpoint commentary item 1806 wherein the viewpoint commentary item 1806 may be a political viewpoint 1808, a social viewpoint 1810, a community viewpoint 1812, and/or a personal viewpoint 1814, and/or a social commentary item 1820 (see FIG. 18), and may have an identification data 126 associated with it, according to one embodiment.

See FIGS. 15-18 for further description on the third-party service 118, the social media account 120, the user 122, the social object 124, and the identification data 126.

Figure 2:
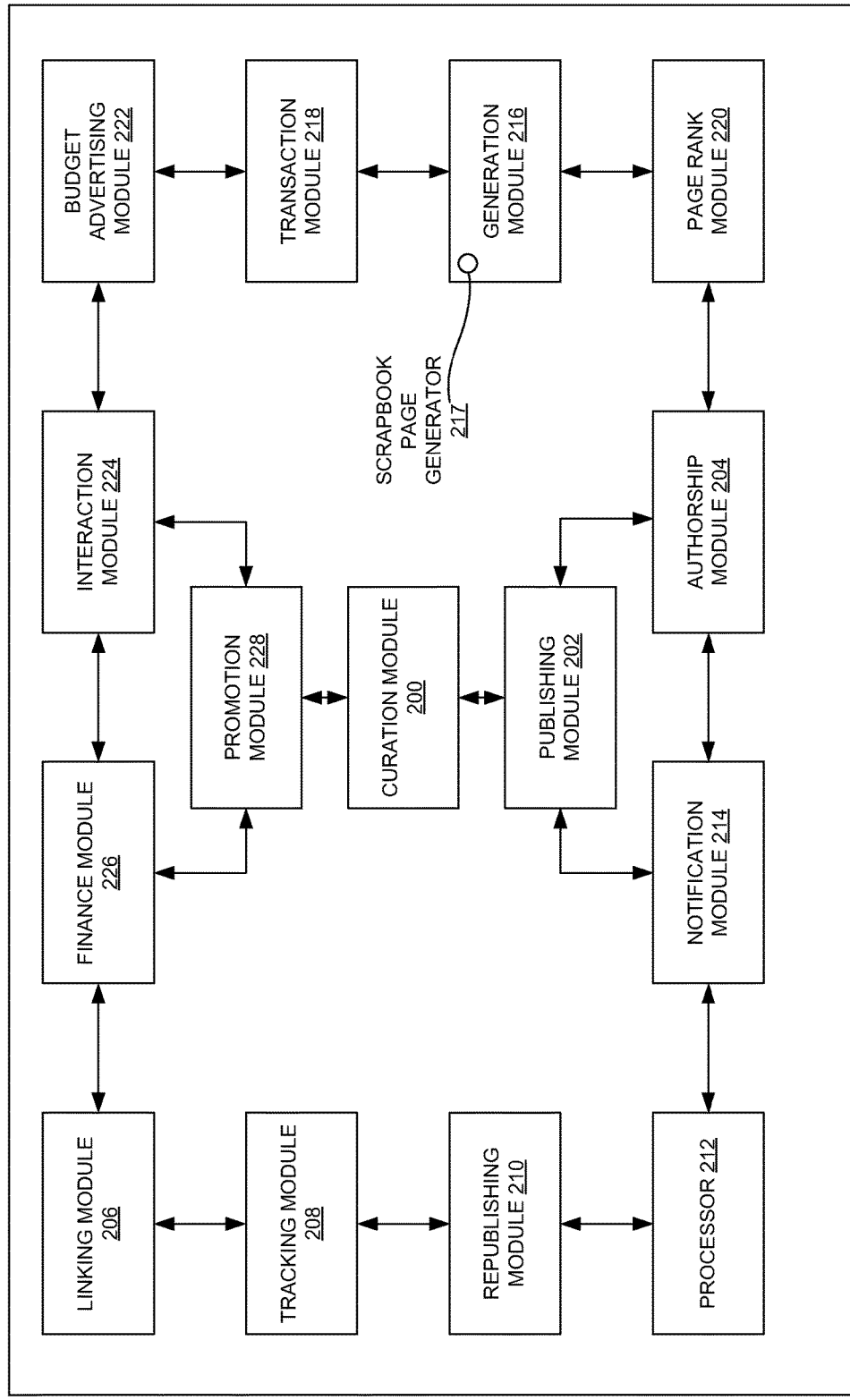
FIG. 2 is a schematic view of modules inside a curated content system curated content system, according to one or more embodiments.

As mentioned above, and according to one exemplary embodiment, the curated content system 100 may comprise the number of modules to implement specific methods and functions of the present invention. FIG. 2 illustrates the functioning of each of the number of modules inside the curated content system 100 to accomplish the creation of the other work of authorship 112 in addition to other functions which will be described in detail below. All of the number of modules within the curated content system 100 may be interconnected in order to compile and publish the other work of authorship 112, among other functions (e.g., notifying the first publisher 114 upon publication of the other work of authorship 112).

The functions performed by the curated content system 100 as identified above may be performed by the number of modules contained within the curated content system 100. For example, the curated content system may contain the curation module 200 which may recognize the original content 110 with the identification meta-data 108 (created in the first publisher server 102 by the first publisher 114) of the original content 110 and may then embed the original content 110 (which carries the unique identification meta-data 108) in the other work of authorship 112 (created by the number of subsequent publishers 116). The curation module 200 may communicate with the publishing module 202 and the authorship module 204 to permit the number of subsequent publishers 116 to publish the other work of authorship 112, according to one embodiment. In another embodiment, the curation module 200 may embed the original content 110 with the corresponding identification meta-data 108 of the original content 110 identifying the first publisher 114 into the other work of authorship 112.

According to one embodiment, the curation module 200 may measure, at a given time, the ability of the number of subsequent publishers 116 to use the original content 110 created by the first publisher 114 to create and publish the other work of authorship 112. The curation module 200 may also communicate with all of the remaining number of modules to perform the functions and methods of the present invention, according to one embodiment. In one particular embodiment, the curation module 200 may permit all of the number of subsequent publishers 116 to have access privileges to a rating score and comments assessed to the original content 110 and the first publisher 114 by the number of subsequent publishers 116. The curation module 200 may also automatically format the other work of authorship 112 to be optimally displayed in a plurality of multimedia formats (e.g., a print format, a video format, a news format, a blog format, etc.) according to one exemplary embodiment. In another embodiment, the curation module 200 may permit the number of subsequent publishers 116 to monitor the other work of authorship 112 on the public wide area network 106 upon subsequent publication from the subsequent publishers 116.

Another important aspect of the curated content system 100 may be the publishing module 202. The publishing module 202 may publish the other work of authorship 112 such that the other work of authorship 112 may be accessible over the public wide area network 106. The publishing module 202 may also determine a publisher of the original content 110 to be the first publisher 114. Similarly, the publishing module 202 may also determine the publisher of the other work of authorship 112 to be the number of subsequent publishers 116. According to one exemplary embodiment, the publishing module 202 may facilitate a process of production and dissemination of the other work of authorship 112 and make it available for public view over the public wide area network 106.

The publishing module 202 may communicate with the authorship module 204 such that the authorship module 204 may determine the creator of both the original content 110 and the other work of authorship 112. The authorship module 204 may determine the author of the original content 110 to be the first publisher 114 and the author of the other work of authorship 112 to be the number of subsequent publishers 116. The authorship module 204 may make a determination of the number of distinct entities and/or a number of distinct persons who may comprise the first publisher 114 and the number of subsequent publishers 116. In one embodiment, the authorship module 204 may designate the first publisher 114 and one of the number of subsequent publishers 116 as a person who originates and/or gives existence to the original content 110 and the other work of authorship 112, respectively.

The authorship module 204 may also attribute the origination and/or the creation of the original content 110 and the other work of authorship 112 to a specific individual and/or an entity acting at a particular time. In another embodiment, the authorship module 204 may assign a responsibility and may give a credit for an intellectual work (e.g., the original content 110 and/or the other work of authorship 112). Such a recognition provided by the authorship module 204 may be critical for the reputation and integrity of the creator (e.g., the first publisher 114 and/or the number of subsequent publishers 116) of the original work of authorship (e.g., the original content 110 and/or the other work of authorship 112), according to one exemplary embodiment.

The curated content system 100 may also include the linking module 206 that may associate the social media account 120 of the user 122 of the third-party service 118 to the curated content system 100 based on the authentication 128 of the social media account 120 through the curated content system 100, according to one embodiment.

The curated content system 100 may also include the tracking module 208 that may generate the identification meta-data 108 to be associated with the original content 110 of the first publisher 114 that may originate in the third party source server 104 of the public wide area network 106, according to one embodiment. In another embodiment, the tracking module 208 may attribute the original content 110 to the first publisher 114 through the identification meta-data 108. The tracking module 208 may also determine an authorship source of the original content 110 and the other work of authorship 112, in addition to an other data related to the original content 110 and the other work of authorship 112 such as the time of creation and place of creation.

The tracking module 208 may also be configured to determine that the social object 124 placed in the third-party service 118 is associated with a page 1500 in the curated content system 100 based on a relevancy match 1504 between the identification data 126 associated with the social object 124 with at least a portion of a content 1502 of the page 1500 (see FIG. 15), according to one embodiment.

The tracking module 208 may communicate with the republishing module 210 which in turn may communicate with the processor 212 configured to automatically republish the social object 124 adjacent to at least the portion of the content 1502 of the page 1500 using the processor 212 (see FIG. 15), according to one embodiment.

The tracking module 208 may communicate with the processor 212 within the curated content system 100. According to an exemplary embodiment, the processor 212 may determine that a subsequent publishing by the number of subsequent publishers 116 of the original content 110 may be an embedded portion of the other work of authorship 112. According to one embodiment, this determination may happen when a communication 810 of the identification meta-data 108 may be extracted from the curated content system 100 in which the subsequent publisher 116 may be manifested and transmitted from the curated content system 100 to the processor 212.

Another important aspect of the curated content system 100 may be the notification module 214. The processor 212 may communicate with the notification module 214. According to one embodiment, the notification module 214 may generate the communication 810 having an identity data of the number of subsequent publishers 116 and a temporal data (e.g., a data that may explicitly refer to the time of creation and/or publication of the other work of authorship 112 and/or a data that may be linked to a certain time and/or period between two moments in time when the other work of authorship 112 may have been created) associated with the subsequent publishing of the other work of authorship 112. The notification module 214 may then transmit the communication 810 to the first publisher 114 of the original content 110 when the other work of authorship 112 is published with the embedded portion having the original content 110.

In yet another embodiment, the notification module 214 may be dependent on the generation module 216 to generate the identification meta-data 108 to be associated with the original content 110 of the first publisher 114 and to generate the communication 810 having the identification meta-data 108 of the number of subsequent publishers 116 that may be transmitted to the first publisher 114. The generation module 216 may generate all of the data needed by the notification module 214 in addition to the identification meta-data 108, according to one embodiment. In one embodiment, the generation module 216 may generate a scrapbook page (using a scrapbook page generator 217). A number of other republished data assets (e.g., photos, videos, text, items) from a number of disparate sources on the web may also appear in a curated form on the scrapbook page generated by the scrapbook page generator 217. The scrapbook page may be a socially sharable web page having a collection of assets such as photos, videos, clips, and/or text that are relevant to the content 1502 of the page 1500 as arranged and/or posted by a user 122. The scrapbook page may be created by the number of subsequent publishers 116 based on a number of interests of the number of subsequent publishers 116 using the generation module 216. The scrapbook page generator 217 and the creation of a number of scrapbook pages are a number of inherent features of the generation module 216, according to one embodiment.

The scrapbook page may be created through the generation module 216 as an arrangement of the subsequent publishing of the original content 110. The scrapbook page may include a curated content (e.g., self selected and placed by the user 122 in a desired form) of the curated content system 110 arranged on the scrapbook page in a manner having meaning to the user 122, wherein the curated content includes the subsequent publishing of the original content 110 and any number of photographs, objects, clippings, and items discovered through the web that resonates with at least one of a personal, a business, and/or an emotional aspect of the user. The scrapbook page created through the scrapbook page generator 217 of the generation module 216 may be shared among a number of users 122 and may be publicly visible and/or private to only a selected subset of the number of users 122 based on permissions set by the number of subsequent publishers 116. In one embodiment, the number of scrapbook pages generated by the scrapbook page generator 217 of the generation module 217 may include a number of public messages, for example, to advertise things to buy and/or sell, announce events, and/or provide an information to friends and/or the public.

The curated content system 100 may also contain the transaction module 218 that may provide a financial incentive to the first publisher 114 depending on an aggregate number of page views associated with the subsequent publishing of the original content 110 in the other work of authorship 112. The transaction module 218 may facilitate financial transactions between the number of subsequent publishers 116 and the first publisher 114 (e.g., if the number of subsequent publishers 116 wishes to monetize the other work of authorship 112 which contains the original content 110 created by the first publisher 114). The creator of the other work of authorship 112 (e.g., the number of subsequent publishers 116) may be given the option to purchase the copyrighted work (e.g., the original content 110) created by the first publisher 114 so that the number of subsequent publishers 116 may copy, adapt, and/or transform the original work of authorship (e.g., the original content 110) created by the first publisher 114.

Closely related to the transaction module 218 may be the page rank module 220. According to one embodiment, the page rank module 220 may determine an algorithm-based page rank of the other work of authorship 112 based on a rating score assessed to the original content 110 and the first publisher 114 by the number of subsequent publishers 116. The financial incentive to the first publisher 114 may also depend on the rating score assessed by the number of subsequent publishers 116 to the original content 110 created by the first publisher 114. The page rank module 220 may assign a numerical weight to each piece of the original content 110 within the other work of authorship 112 with the purpose of measuring a relative importance of the original content 110 within the other work of authorship 112 (compared to a number of other original content 110 created by a number of other first publishers 114). The rating score assessed to the original content 110 may be determined by measuring both a quality and a quantity of each piece of the content 110 (created and published by a number of first publishers 114) that qualifies as the original content 110 and that may be embedded in the other work of authorship 112 (by the number of subsequent publishers 116).

The curated content system 100 may also include the budget advertising module 222 that may automatically calculate an estimated branding value 1600 based on republishing of the social object 124 adjacent to at least the portion of the content 1502 of the page 1500 (see FIG. 16), according to one embodiment.

The curated content system 100 may also include the interaction module 224, which may interact with the budget advertising module 222, that may automatically measure the interaction 1602 with the social object 124 adjacent to at least the portion of the content 1502 of the page 1500 (see FIG. 16), according to one embodiment.

The interaction module 224 may communicate with the finance module 226 within the curated content system 100. The finance module 226 may debit 1614 a financial account 1612 associated with the user 122 of the third-party service 118 based on the interaction 1602 (see FIG. 16), according to one embodiment.

The curated content system 100 may also include the promotion module 228 that promotes the social object 124 in a number of pages of the curated content system 100 based on a budget 1700 of the user 122 of a third party service 118, wherein the number of pages in which the social object 124 is republished is proportional to the budget 1700 of the user 122 of the third-party service 118 (see FIG. 17), according to one embodiment.

Figure 3:
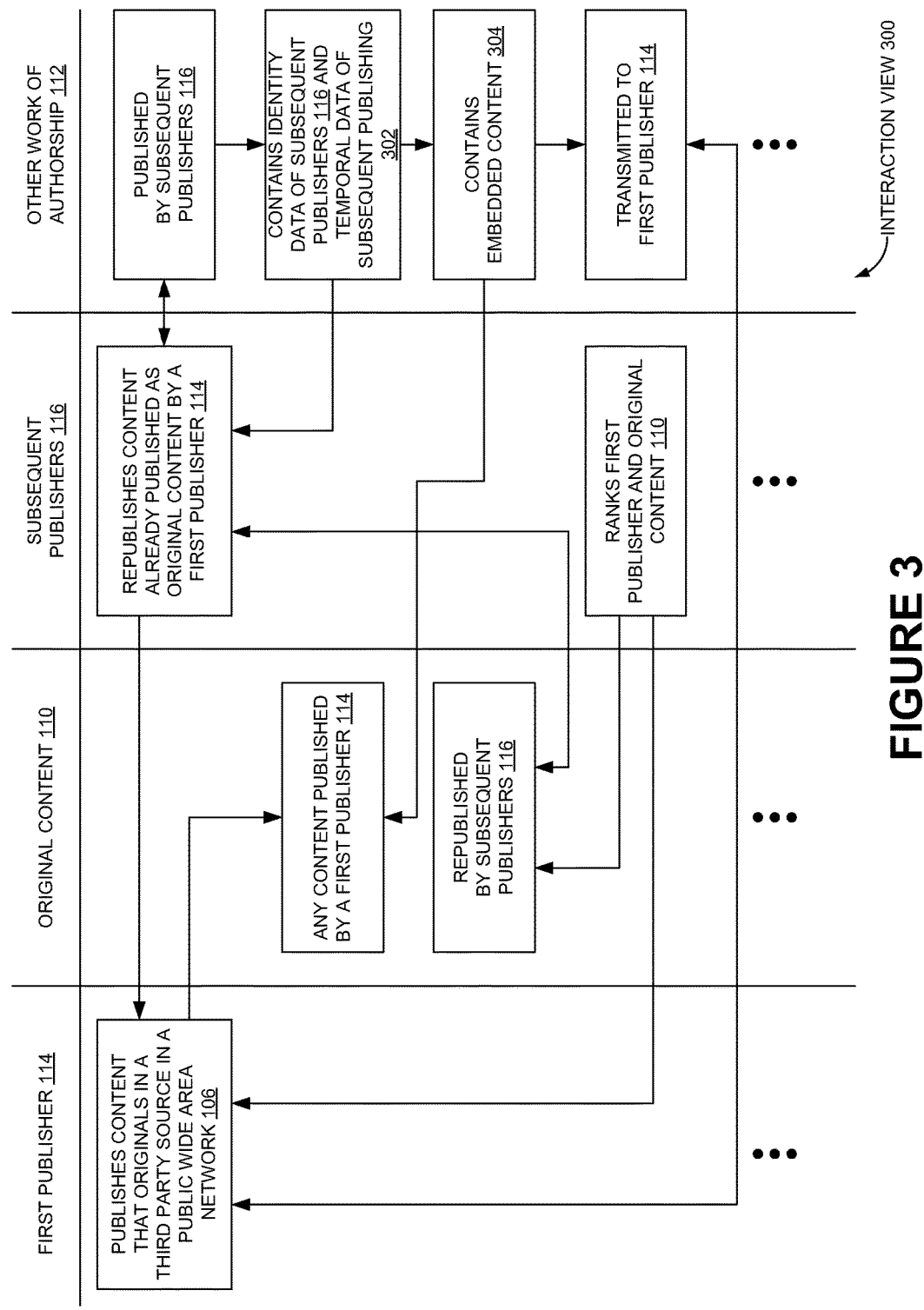
FIG. 3 illustrates an interaction view of the publisher, original content, subsequent publisher and an other work of authorship, according to one or more embodiments.

FIG. 3 illustrates an interaction view 300 according to one exemplary embodiment. The first publisher 114 may publish the content 1502 that may originate in the third party source server 104 in the public wide area network 106. The original content 110 may be the content 1502 (e.g., an online content created on the social networking website and/or an other website) that may be created and published by the first publisher 114. The original content 110 may also be republished by the number of subsequent publishers 116 and the number of subsequent publishers 116 may republish the content 1502 already published as the original content 110 by the first publisher 114, according to one embodiment.

According to another embodiment, the number of subsequent publishers 116 may also rank the first publisher 114 and the original content 110. In one embodiment, the other work of authorship 112 may be published by the number of the subsequent publishers 116 and may contain the identity data of the number of the subsequent publishers 116 and the first publisher 114 as well as the temporal data associated with the subsequent publishing 302. In this embodiment, the other work of authorship 112 may contain an embedded content 304 from a number of disparate online (e.g., Internet) sources and may transmit the temporal data associated with the subsequent publishing 302 to the first publisher 114 of the original content 110 when the other work of authorship 112 is published with the embedded content 304 portion having the original content 110.

Figure 4:
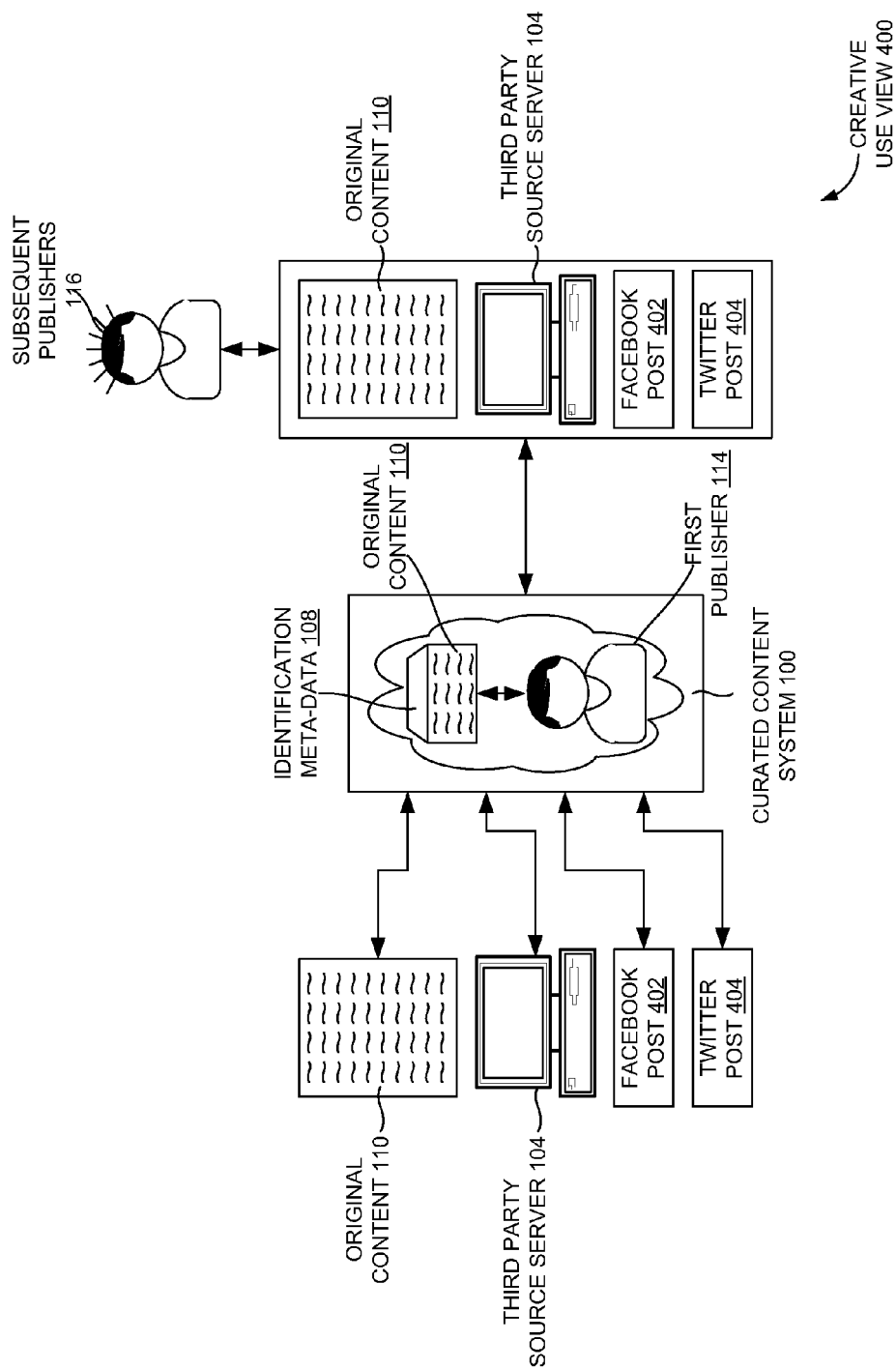
FIG. 4 illustrates a creative use view, according to one or more embodiments.

FIG. 4 illustrates a creative use view 400 according to one exemplary embodiment. The original content 110 may be found in the third party source server 104 which may in turn be the Facebook® post 402 and/or a Twitter® post 404, each containing the identification meta-data 108 of the original content 110, which may specifically identify the creator as the first publisher 114. The curated content system 100 may compile the original content 110 (e.g., a Facebook® post 402 and/or a Twitter® post 404) and associate it with the first publisher 114 via the identification meta-data 108 associated with the Facebook® post 402 and/or the Twitter® post 404. The number of subsequent publishers 116 may then republish the original content 110 (e.g., the Facebook® post 402 and/or the Twitter® post 404) found in the third party source server 104 using the curated content system 100, according to one exemplary embodiment.

According to another embodiment, the transaction module 218 may provide a financial incentive to the first publisher 114 proportional to at least one of an aggregate number of views, a unique visitor count, a bounce rate, a social sharing date, and a commenting rate associated with the subsequent publishing of the original content 110 in the other work of authorship 112. In this embodiment, the other work of authorship 112 may be separately copyrightable comprising an other original content 904 (created by the number of subsequent publishers 116) in addition to a leveraged and attributed content 910 from a number of disparate media sources (e.g., from a social networking website on the Internet).

FIG. 5 illustrates a table view 500 according to one embodiment. The first publisher 114 may be Jack, John, Adam, Ash, etc. The original content 110 published by Jack may be the Twitter® post 404. The original content 110 published by John may be the Facebook® post 402 and the Twitter® post 404. The original content 110 published by Adam may be a YouTube® video 504 and the original content 110 produced by Ash may be the Facebook® post 402. The number of subsequent publishers 116 may be Jane, Jill, Ashley, Alice, etc. and would correspond to the first publisher 114 being Jack, John, Adam, Ash, etc., respectively. The other work of authorship 112 republished by Jane may be the YouTube® video 504 and the Twitter® post 404 wherein a posted content 502 may be the Twitter® post 404 published by Jack, according to one embodiment. The other work of authorship 112 republished by Jill may be the Facebook® post 402 and the Twitter® post 404 published by John in addition to the YouTube® video wherein the posted content 502 may be the Facebook® post 402 and the Twitter® post 404 published by John, according to another embodiment.

Similarly, the other work of authorship 112 republished by Ashley may be a web page, the Facebook® post 402 and the YouTube® video 502 of Adam wherein the posted content 502 may be the YouTube® video 502 of Adam along with the identity of subsequent publisher 116 Adam provided by the identification meta-data 108 included in the YouTube® video 504 of Adam. Finally, the other work of authorship 112 republished by Alice may include the Twitter® post 404 and the YouTube® video 504 including the Facebook® post 402 of Ash wherein the posted content 502 may be the Facebook® post 402 of Ash along with the identity of the subsequent publisher 116 of Ash and the temporal data 302 of Ash provided by the identification meta-data 108 included in the YouTube® video 504 of Ash, according to one embodiment.

Figure 7:
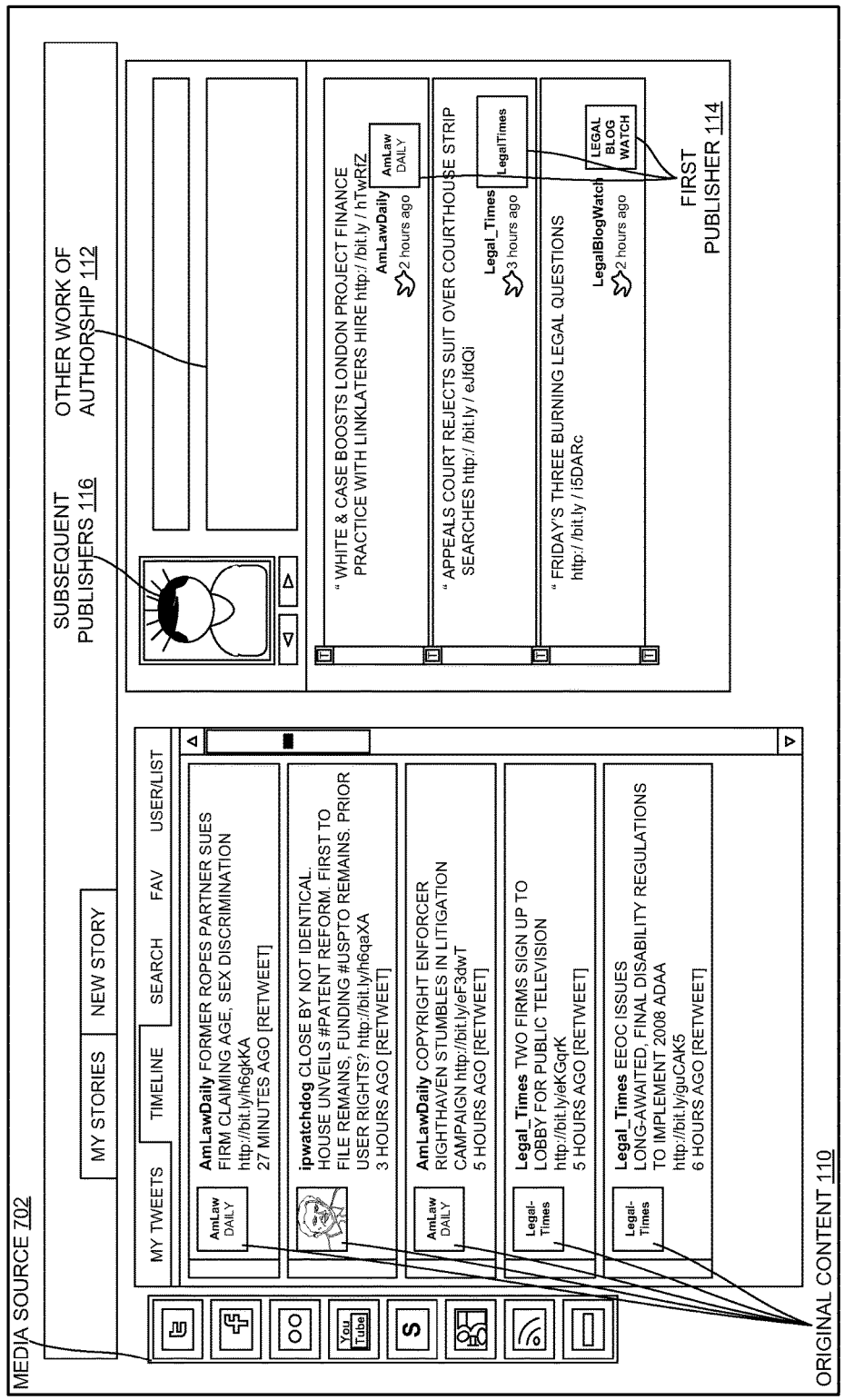
FIG. 7 illustrates a user interface view of the present invention, according to one or more embodiments.

FIG. 7 illustrates a user interface view 700 according to one embodiment. The original content 110 may be derived from a disparate media source, such as a media source 702 (e.g., the Twitter® site, the Facebook® site, the YouTube® site, etc.). The number of subsequent publishers 116 may then republish the original content 110 in the other work of authorship 112 by using the content 1502 already published by the first publisher 114, according to one embodiment. This operation may take place inside the curated content system 100. The number of subsequent publishers 116 may also have the freedom to pick and choose which of the original content 110 from which of the number of first publishers 114 he/she may want to republish in the other work of authorship 112, according to one exemplary embodiment.

In yet another embodiment, the third party source server 104 of the public wide area network 106 may be a social network-based publication system 1102 (e.g. a short messaging system, Instagram®, Facebook®, Pinterest®, a blog, and an other media creation platform) that may be monitored by the number of subsequent publishers 116 through a posted content management server (e.g., the curated content system 100) in which the other work of authorship 112 may be compiled prior to publishing (e.g., republishing by the number of subsequent publishers 116 as the other work of authorship 112).

Figure 8A:
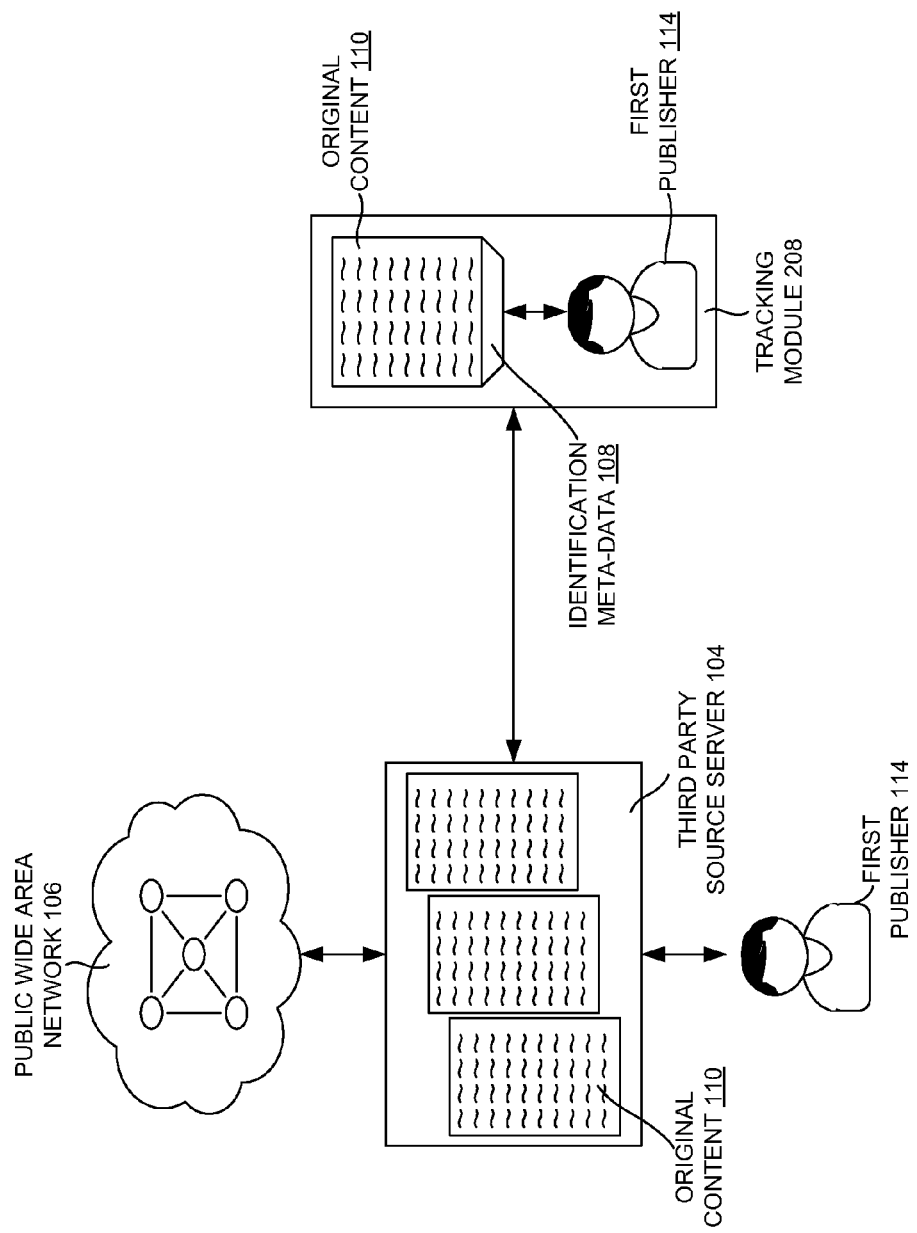
FIG. 8A is a schematic view of a tracking module, according to one or more embodiments.

FIG. 8A illustrates a tracking module 208 according to one embodiment. The original content 110 may be found in the third party source server 104 and may be published by the first publisher 114. The third party source server 104 may be a part of the public wide area network 106. The tracking module 208 may embed the identification meta-data 108 in the original content 110 to identify and track the original content 110 to the first publisher 114, according to one embodiment.

Figure 8B:
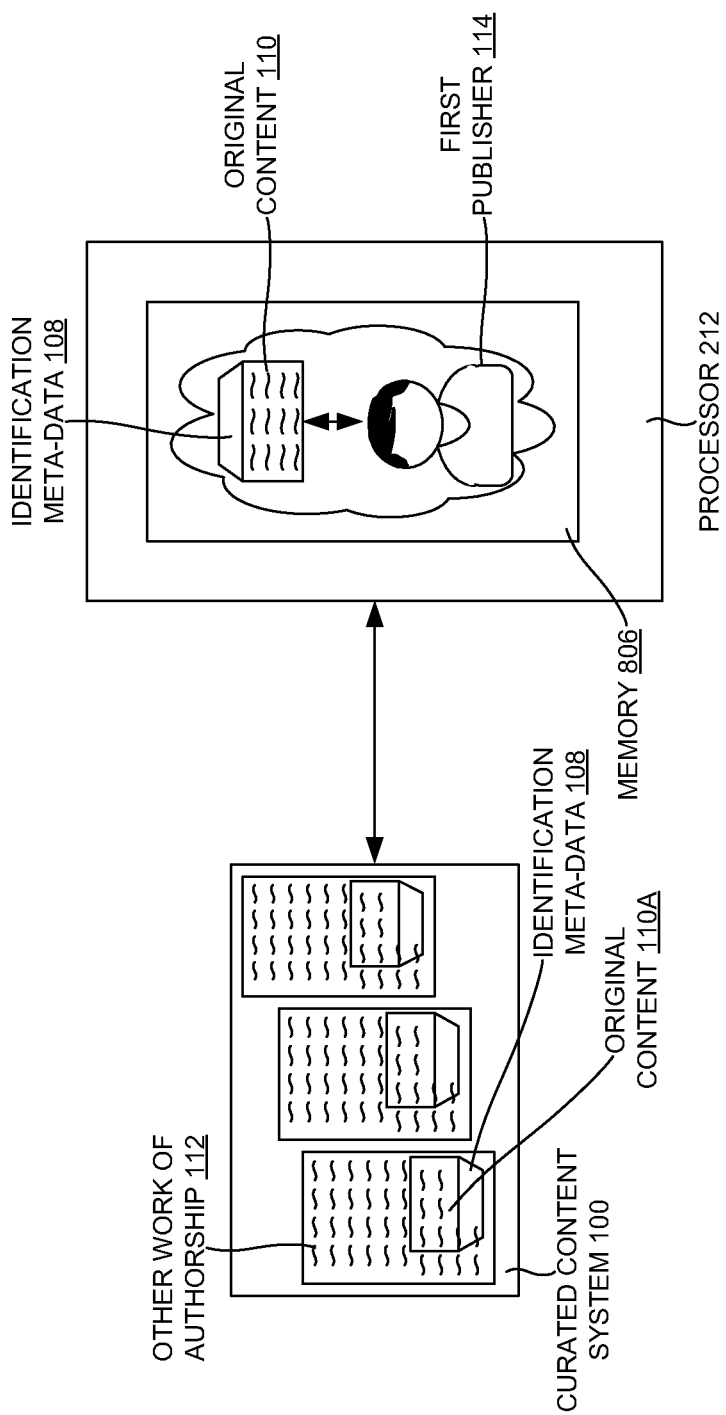
FIG. 8B is a schematic view of the interaction between the tracking module and a processor, according to one or more embodiments.

FIG. 8B illustrates a processor 212. According to an exemplary embodiment, the processor 212 may determine that a subsequent publishing as the other work of authorship 112 of the original content 110 may be an embedded portion 304 of the other work of authorship 112. In this embodiment, the curated content system 100 may compile the original content 110 along with the identification meta-data 108 and incorporate both into the other work of authorship 112. According to another exemplary embodiment, the processor 212 and a memory 806 may determine that the original content 110 may be published by the first publisher 114 by utilizing the identification meta-data 108 associated with the original content 110. It may be appreciated that the processor 212 of FIG. 8B may be the same and/or similar to a processor 602 of FIG. 6 and may perform substantially the same functions.

Figure 8C:
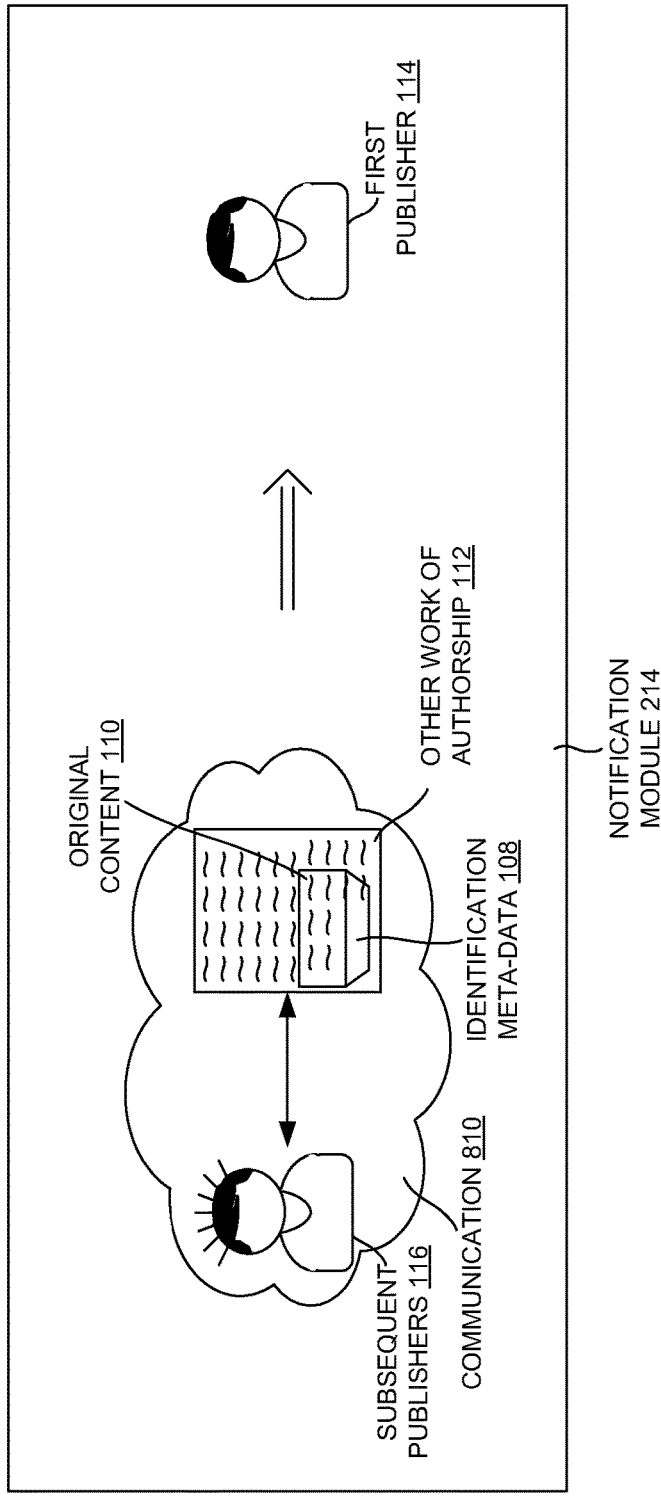
FIG. 8C is a schematic view of a notification module, according to one or more embodiment.

FIG. 8C illustrates a notification module 214 according to one exemplary embodiment. The processor 212 may communicate with the notification module 214. According to one embodiment, the notification module 214 may generate the communication 810 having the identity data of the number of subsequent publishers 116 associated with the subsequent publishing 302 of the other work of authorship 112 having the original content 110 (associable to the first publisher 114 by the identification meta-data 108). The notification module 214 may then transmit the communication 810 to the first publisher 114 of the original content 110 when the other work of authorship 112 is published with the embedded content portion 304 having the original content 110. The communication 810 may comprise a republishing data associated with the republishing of the original content 110 (such as a location of republishing, a date of republishing, a time of republishing, etc.), according to one embodiment.

According to another exemplary embodiment, a posted content management portal (e.g., the curated content system 100), may automatically format the other work of authorship 112 to be optimally displayed in a plurality of multimedia format types including print 1202 (e.g., for a newspaper), tablet format (e.g., for the iPad®), video 1204 (e.g., for the YouTube® site), online news 1206 (e.g., for The New York Times® reader), and/or blog format 1208 (e.g., for Blogger®, Tumblr®, Posterous®, etc.). In this embodiment, each embedded content 302 of the original content 110 of the first publisher 114 in the other work of authorship 112 may be directly interactive through a location where the other work of authorship 112 may be published in a manner in which a click-through on the embedded content 302 portion of the other work of authorship 112 may transport a navigation pane 1210 presently comprising a particular republishing of the original content 110 to the social network-based publication system 1102 in which the original content 110 may be first published by the first publisher 114.

Figure 9A:
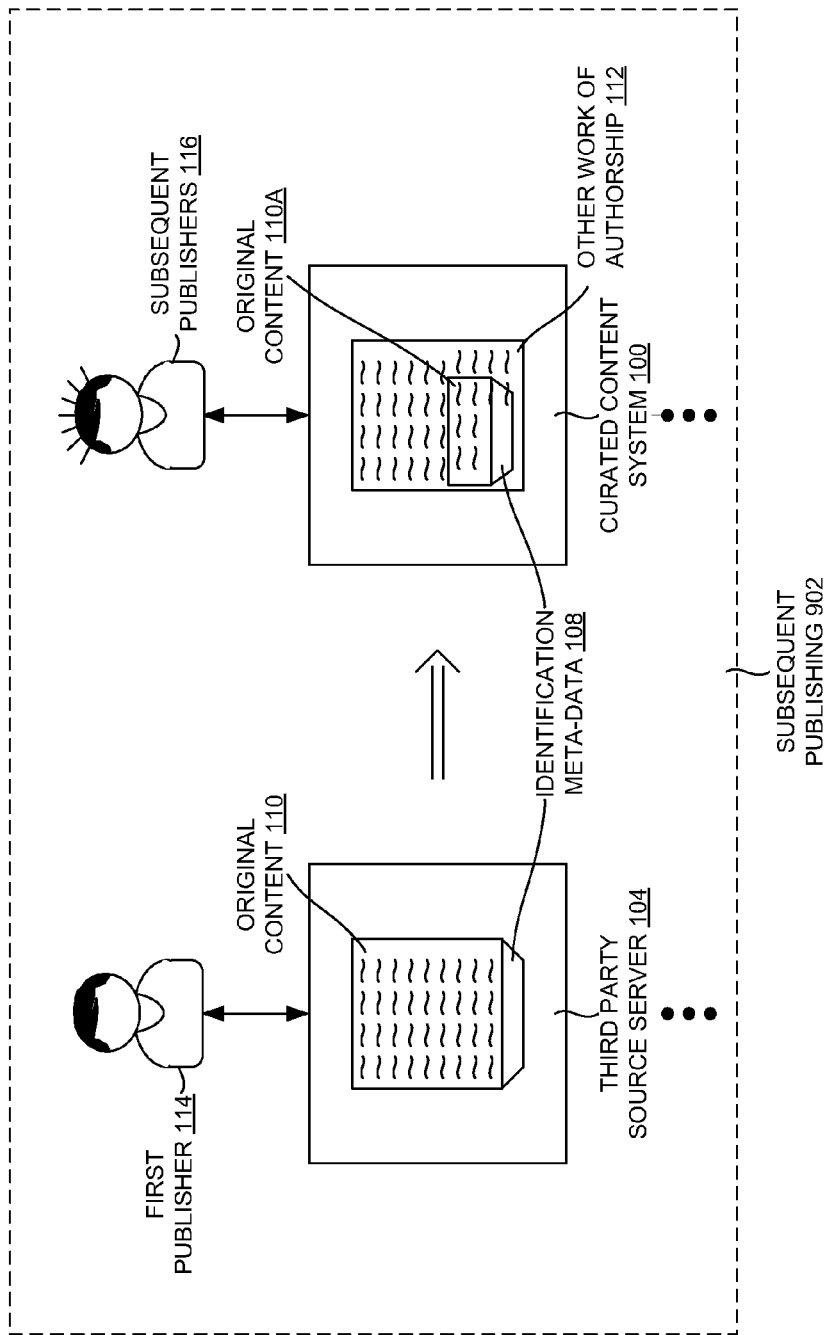
FIG. 9A is a schematic view of the subsequent publishing of the original content, according to one or more embodiments.

FIG. 9A illustrates the subsequent publishing 902 of the original content 110, according to one embodiment. The first publisher 114 may create and publish the original content 110 in the third party source server 104. The identification meta-data 108 may associate the first publisher 114 with the original content 110. The number of subsequent publishers 116 may then republish at least a part of the original content 110 in the other work of authorship 112 in the curated content system 100.

Figure 9B:
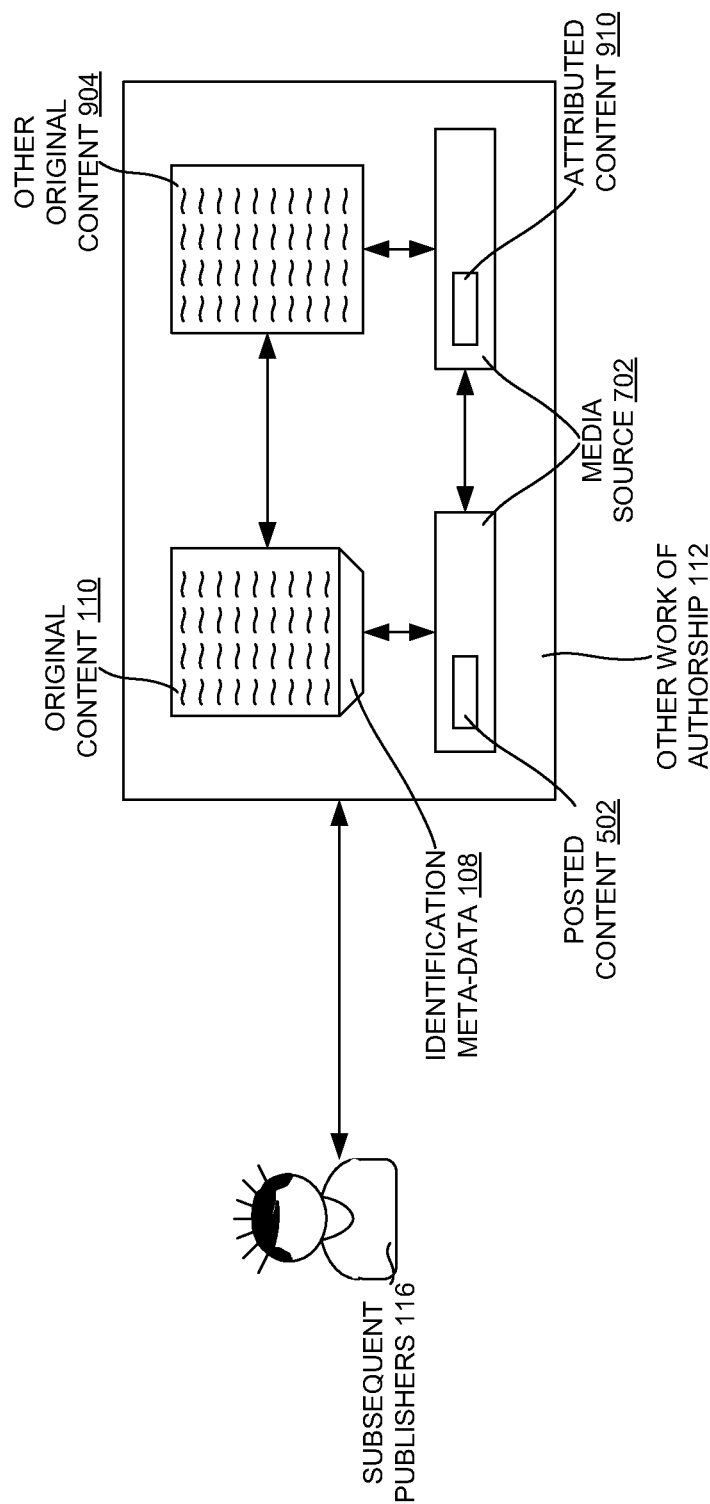
FIG. 9B is a schematic view of a posted content and an attributed content inside a media source, according to one or more embodiments.

FIG. 9B illustrates a posted content 502 and an attributed content 910 inside the media source 702 in the other work of authorship 112, according to one embodiment. It may be that according to one embodiment that the number of subsequent publishers 116 may create and publish the other work of authorship 112 which may republish the original content 110 created by the first publisher 114 identifiable with the identification meta-data 108 embedded in the original content 110. The number of subsequent publishers 116 may also publish the other original content 904 in the other work of authorship 112 wherein both the original content 110 and the other original content 904 of the number of subsequent publishers 116 are associable with the media source 702 which may contain the posted content 502 (e.g., the original content 110 that the number of subsequent publishers 116 has decided to use and republish in the other work of authorship 112), and the attributed content 910 (e.g., the number of portions of the original content 110 that the number of subsequent publishers 116 has republished in the other of work of authorship 112), according to one embodiment.

It may be that according to one exemplary embodiment, the posted content management portal (e.g., the curated content system 100) may determine which of the original content 110 is trusted in the public wide area network 106 based on a republishing history associated with the original content 110, contributions of the first publisher 114 and the number of other first publishers of other original content 904, and which algorithmically presents a preferred content to the number of subsequent publishers 116. This determination, according to one embodiment, may be based on a criteria that may include a popularity of republishing of the original content 110 and a credibility scoring of the first publisher 114 and the number of other first publishers that may be determined based on an algorithmic page rank of republished destinations and a number of originated sources of the original content 110.

Figure 10:
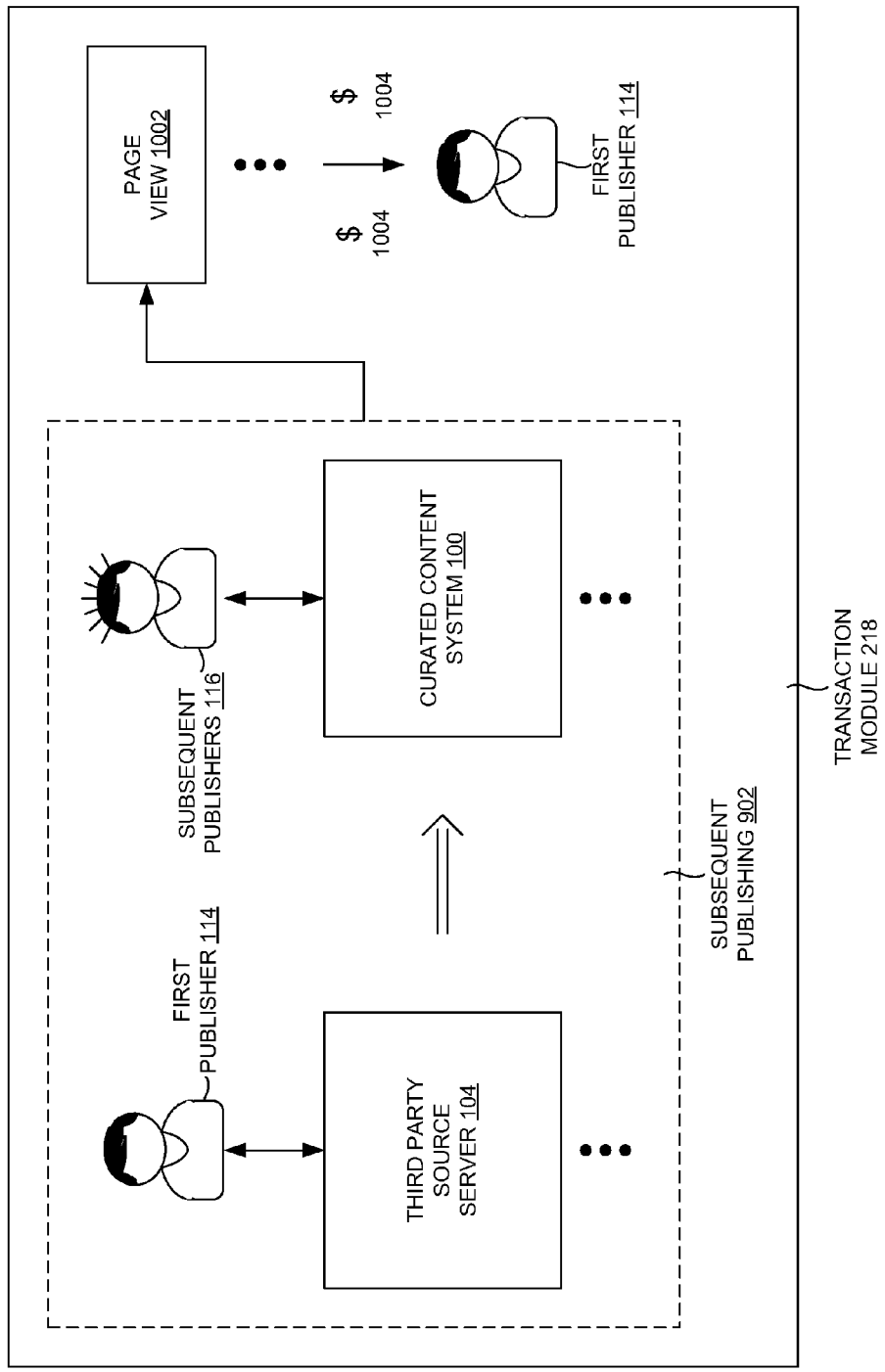
FIG. 10 is a schematic view of a transaction module, according to one or more embodiments.

FIG. 10 illustrates the transaction module 218 according to one embodiment. A subsequent publishing 902 of the original content 110 by the first publisher 114 found in the third party source server 104 may happen in the curated content system 100 by the number of subsequent publishers 116. The transaction module 218 may determine a page view 1002 (e.g., a number of times a republished original content 110 is viewed) and may then determine a financial value 1004 attributable to the first publisher 114 based on the page view 1002.

The page view 1002 may be a page impression which may be a request to load a single page of the Internet web site that may contain a republishing of the original content 110 by the number of subsequent publishers 116, according to one embodiment. On the public wide area network 106, the page view 1002 may result from a web user clicking on a link on an other HTML page pointing to the page which may contain a republishing of the original content 110 by the number of subsequent publishers 116, according to one embodiment. The page view 1002 may include a request for the original content 110 found in the other work of authorship 112 whose type may be defined as a page 1002 in a log analysis. In a log analysis, the page view 1002 may generate multiple hits as all the resources required to view the page, according to one embodiment.

Figure 11:
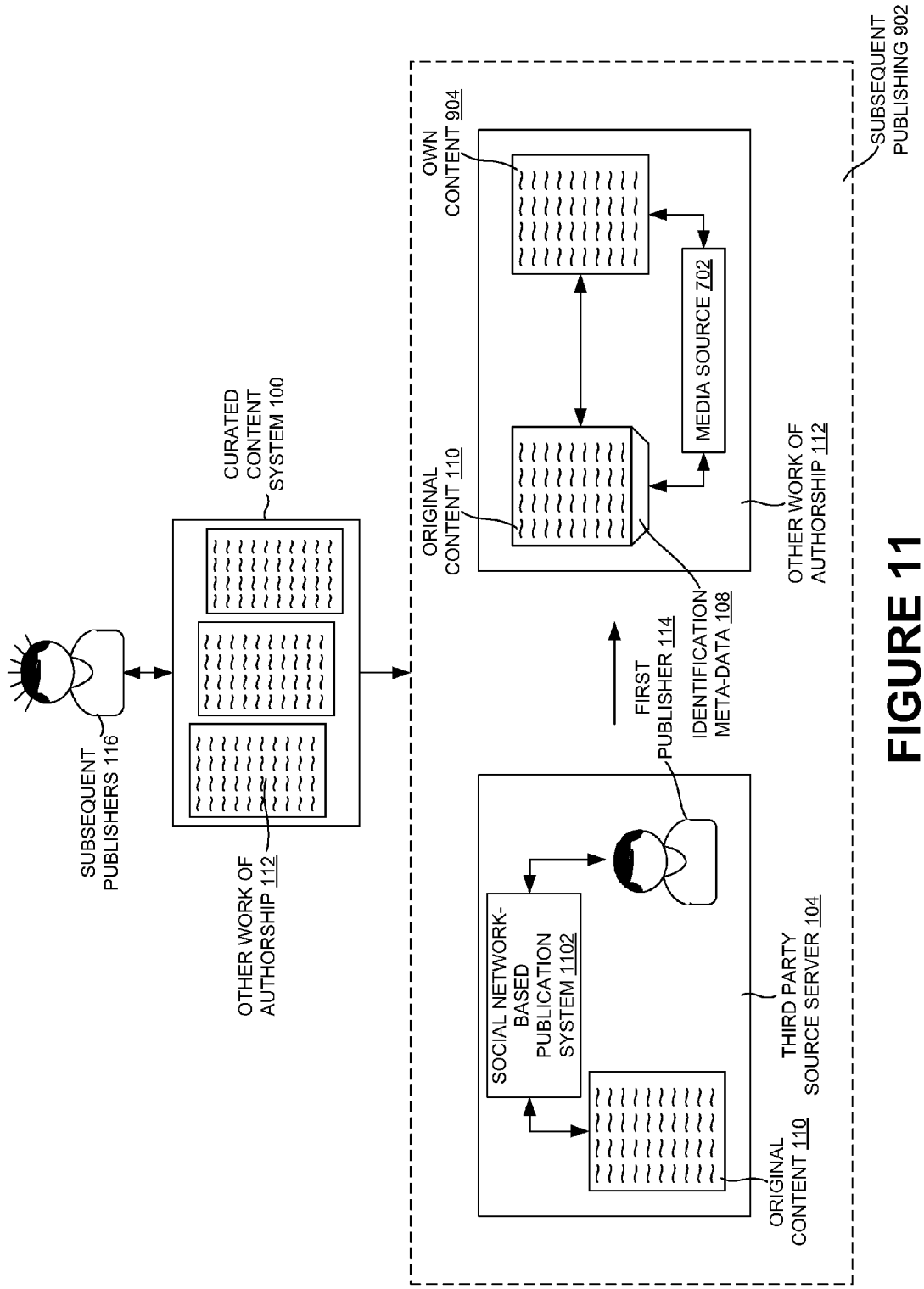
FIG. 11 is a schematic view of functioning between a curated content system server curated content system and the subsequent publishing of the original content, according to one or more embodiments.

FIG. 11 illustrates the functioning between the curated content system 100 and the subsequent publishing 902 of the original content 110 in the other work of authorship 112, according to one embodiment. The third party source server 104 of the public wide area network 106 may be the social network-based publication system 1102 that may be monitored by the number of subsequent publishers 116 through the posted content management server (e.g., the curated content system 100) in which the other work of authorship 112 may be compiled prior to publishing (e.g., republishing by the number of subsequent publishers 116 as the other work of authorship 112). It may be that according to one embodiment that the number of subsequent publishers 116 may create and publish the other work of authorship 112 which may republish the original content 110 created by the first publisher 114 identifiable with the identification meta-data 108 embedded in the original content 110. The number of subsequent publishers 116 may also publish the other original content 904 in the other work of authorship 112 wherein both the original content 110 and the other original content 904 of the number of subsequent publishers 116 are associable with the media source 702.

Figure 12A:
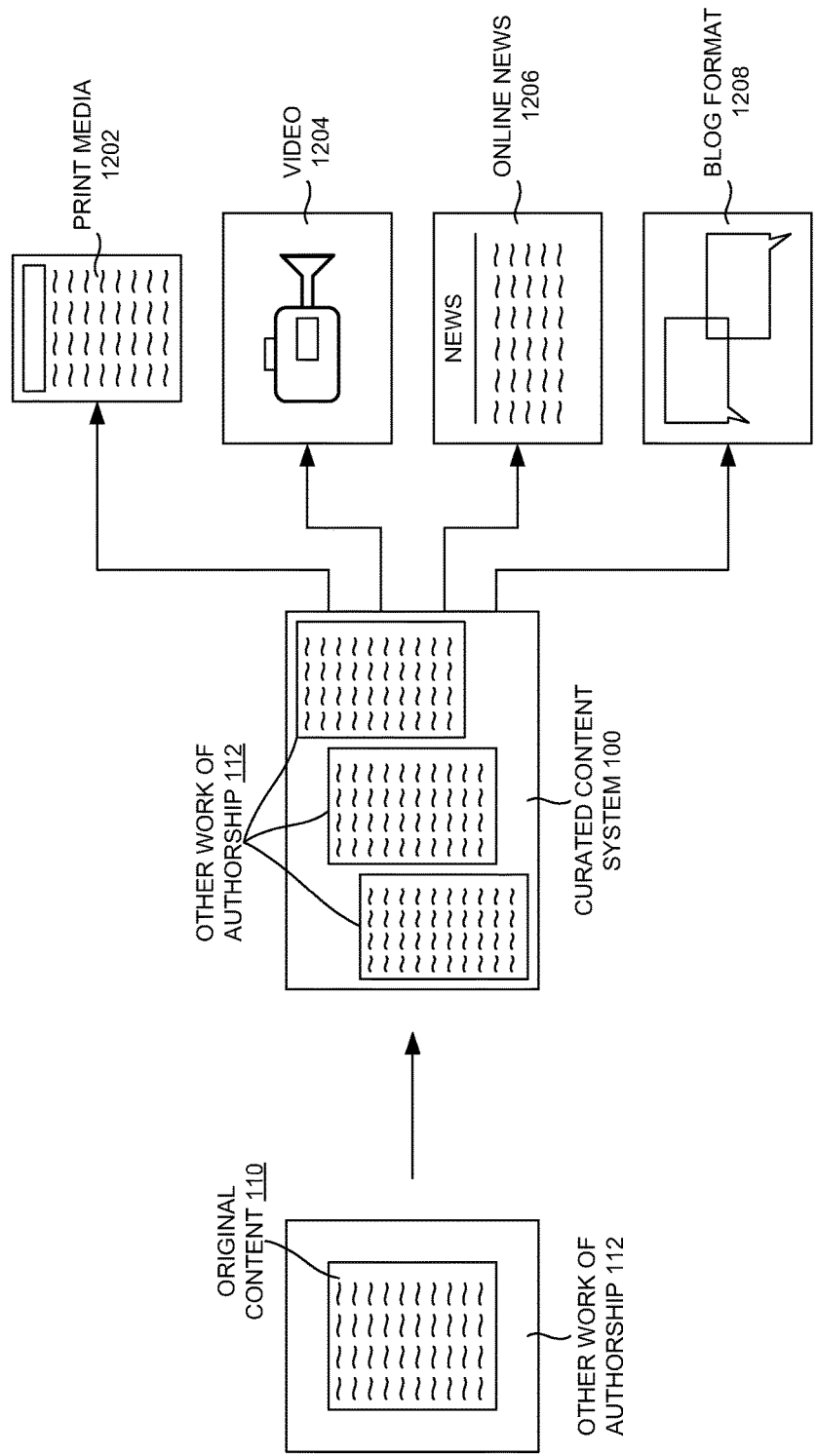
FIG. 12A is a schematic view of formatting the other work of authorship through a curated content system curated content system to be displayed in a plurality of multimedia formats, according to one or more embodiments.
Figure 12B:
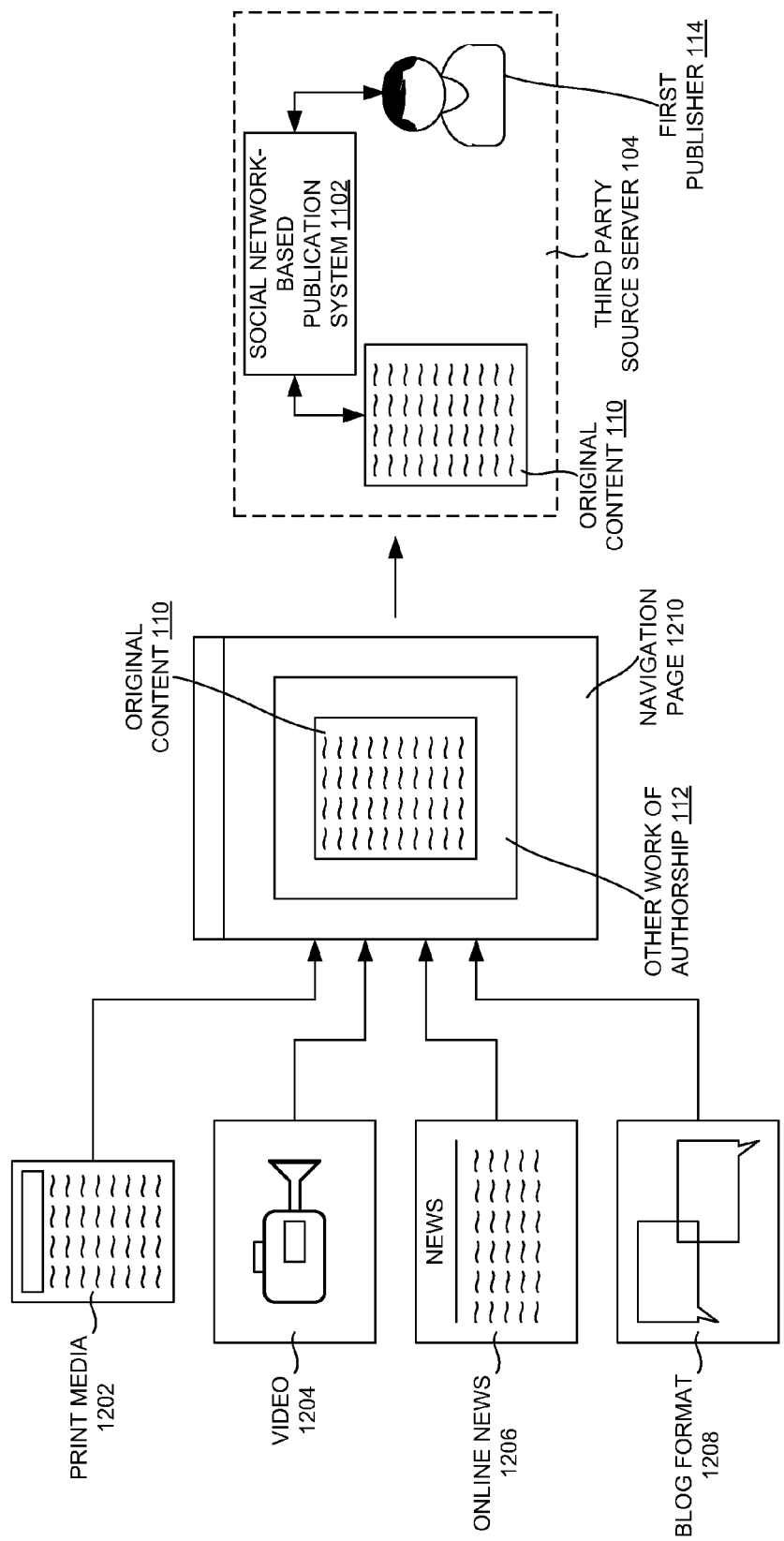
FIG. 12B is a schematic view of formatting the other work of authorship through a curated content system curated content system to be displayed in a plurality of multimedia formats and a social network-based publication system, according to one or more embodiments.

FIGS. 12A and 12B illustrate another exemplary embodiment wherein the posted content management portal (e.g., the curated content system 100), may automatically format the other work of authorship 112 to be optimally displayed in a plurality of multimedia format types including print 1202 (e.g., for a newspaper), tablet format (e.g., for the iPad®), video 1204 (e.g., for the YouTube® site), online news 1206 (e.g., for The New York Times® reader), and/or blog format 1208 (e.g., for Blogger®, Tumblr®, Posterous®, etc.). In this embodiment, each embedded instance of the original content 110 of the first publisher 114 in the other work of authorship 112 may be directly interactive through the location where the other work of authorship 112 may be published in a manner in which a click-through on the embedded content 304 portion of the other work of authorship 112 may transport a navigation pane 1210 (as shown in FIG. 12B) presently comprising a particular republishing of the original content 110 to the social network-based publication system 1102 in which the original content 110 may be first published by the first publisher 114.

According to another exemplary embodiment, the determination based on the algorithmic page rank of republished destinations and the number of originated sources of the original content 110 may also consider a rating score assessed to the original content 110 and the number of first publishers by the number of subsequent publishers 116. This rating score of the original content 110 and the number of first publishers may be provided in the curated content system 100 such that all of the number of subsequent publishers 116 may have access to ratings and associated comments provided by a peer subsequent publisher.

Figure 13:
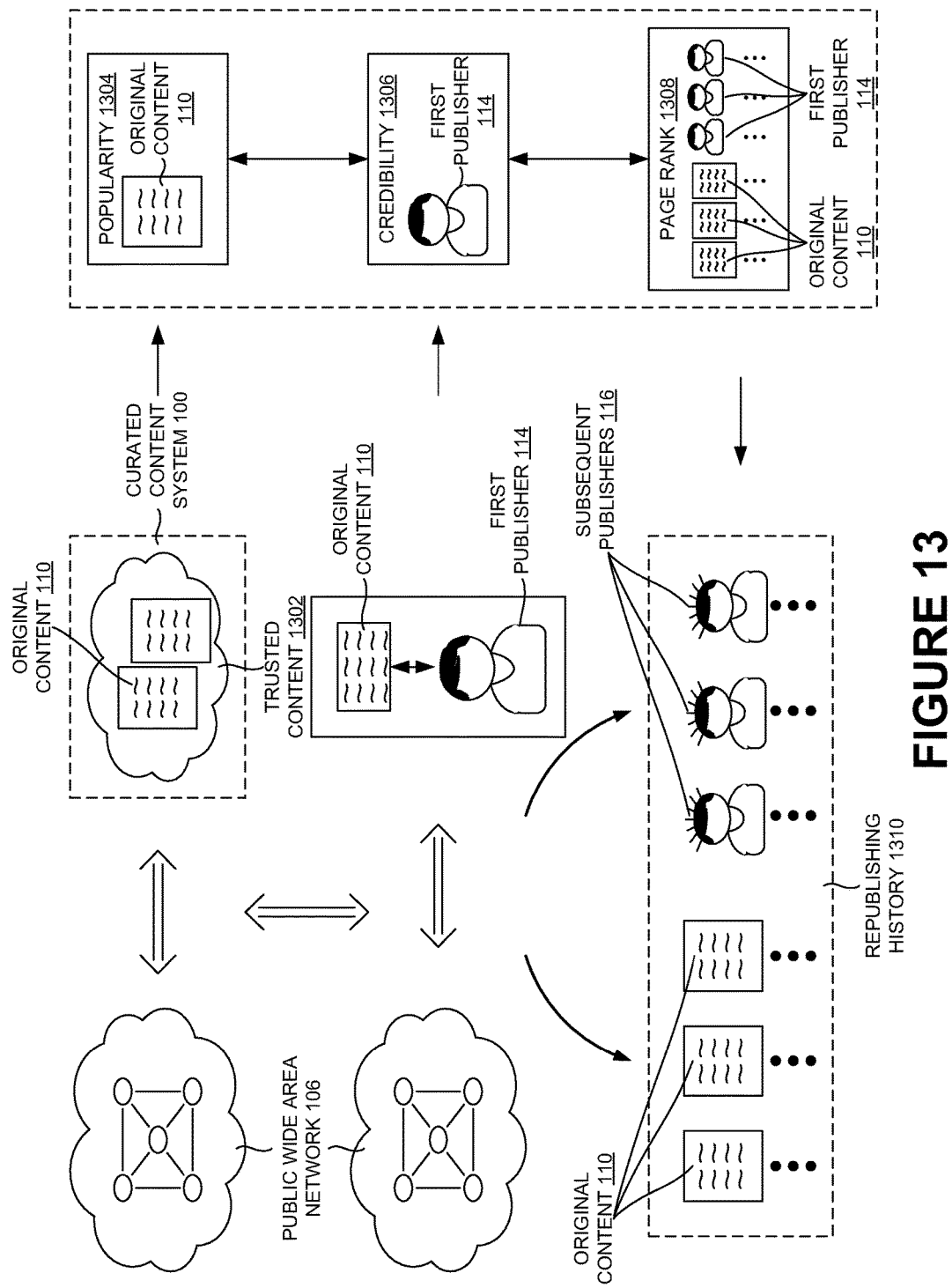
FIG. 13 is a schematic view of a rating score system of the first publisher and original content, according to one or more embodiments.

FIG. 13 illustrates the functioning of the rating score method of the present invention, according to one embodiment. The curated content system 100 may determine that a certain original content 110 may be a trusted content 1302 (the original content 110 found in the public wide area network 106 and created by the first publisher 114). According to one embodiment, the curated content system 100 may assign a popularity 1304 to the original content 110, a credibility 1306 to the first publisher 114 and a page rank 1308 to both the original content 110 and the first publisher 114. The popularity 1304, the credibility 1306 and the page rank 1308 may be a part of the republishing history 1310 which may associate the popularity 1304, the credibility 1306 and the page rank 1308 to the original content 110 when republished by the number of subsequent publishers 116, according to one embodiment.

Figure 14:
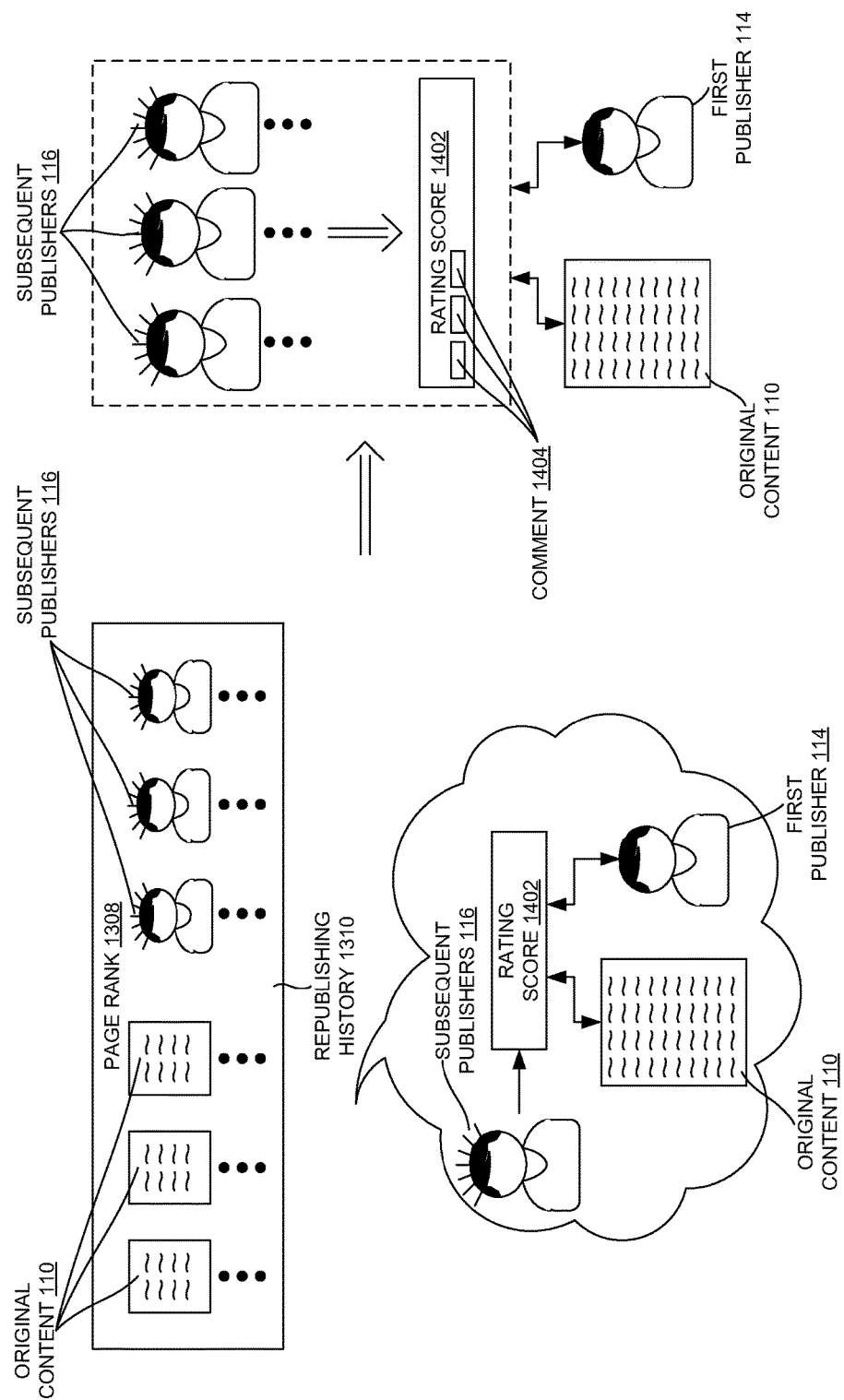
FIG. 14 is a schematic view of a rating score that is assigned to an original content and a first publisher, according to one or more embodiments.

FIG. 14 illustrates a rating score 1402 that may be assigned to the original content 110 and the first publisher 114, according to one embodiment. The popularity 1304, credibility 1306 and the page rank 1308 of the original content 110 and the first publisher 114 may be assigned a single rating score 1402 wherein a comment 1404 may be permitted by a number of other subsequent publishers 116. This rating score 1402 may then be assigned to the original content 110 and the first publisher 114 as illustrated in FIG. 14, according to one embodiment.

Figure 15:
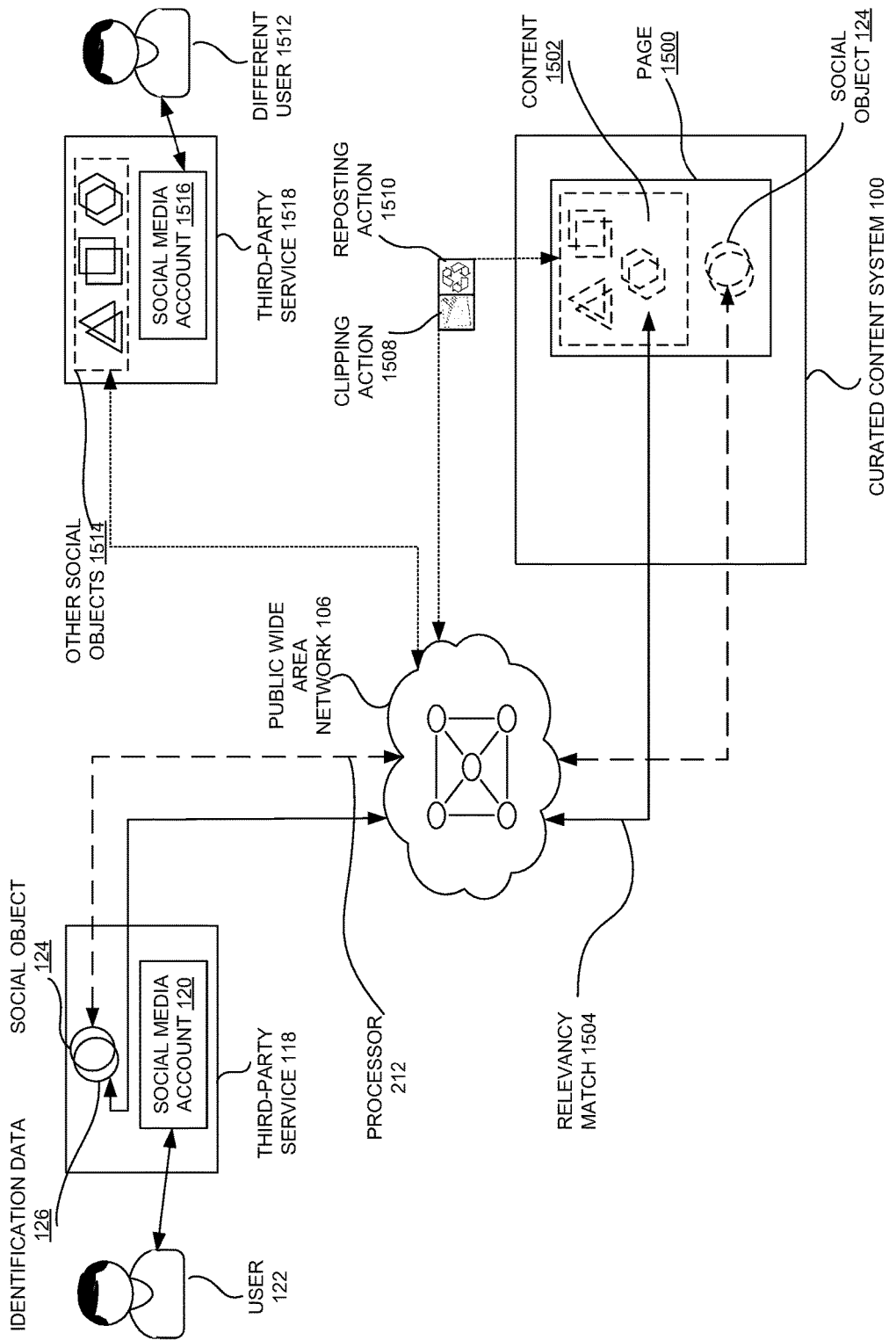
FIG. 15 is a schematic view of a user, a different user, and the republishing of social objects onto a page of the curated content system, according to one or more embodiments.

Reference is now made to FIG. 15, which illustrates the social object 124 placed in the third-party service 118 being associated with a page 1500 of the curated content system 100 based on a relevancy match 1504 between the identification data 126 associated with the social object 124 and at least a portion of the content 1502 of the page 1500, according to one embodiment.

In one embodiment, the curated content system 100 may contain a page 1500 that contains the content 1502. The page 1500 and the content 1502 may be created by a different user 1512 by republishing a number of other social objects 1514 onto the curated content system 100. The curated content system 100 may contain a number of pages with an associating content, and each of the pages and the content 1502 of each of the pages may be created by at least one different user 1512 by republishing the number of other social objects 1514, according to one embodiment. The user 122 and the different user 1512, as well as the social media account 120 and a social media account 1516, may be a number of separate entities; and the third-party service 118 and a third-party service 1518 may be different services or the same service, according to one or more embodiments.

In one embodiment, there may be the social media account 120 of the user 122 associated with the third-party service 118. The social media account 120 may be associated with the curated content system 100 in a manner that was described in the discussion of FIG. 1. The social media account 1516 of the different user 1512 may be associated with the curated content system 100 in a similar manner, according to one embodiment.

In one embodiment, the social object 124 may originate within the third-party service 118, and/or may be leveraged from a disparate source. The identification data 126 may originate within the social object 124 which in turn may reside within the third-party service 118. Similarly, after the social object 124 is republished (described hereinafter), the identification data 126 may originate within the social object 124, which in turn may reside within the page 1500 in the curated content system 100. The page 1500 may reside entirely inside the curated content system 100.

The identification data 126 may contain the structured hidden information that may describe a number of features of the social object 124 (e.g., the name of the creator of the social object 124, the time the social object 124 was created, the location where the social object 124 was created, the IP address from where the social object 124 was created, etc.). The identification data 126 may also provide the descriptive information about the context, the quality, the condition, and/or the number of characteristics of the underlying data (e.g., of the social object 124), according to one embodiment. According to another embodiment, the identification data 126 may also include the number of attributes such as the date and a number of time stamps associated with the social object 124.

In one embodiment, the curated content system 100 may determine that the social object 124 is associated with the page 1500 in the curated content system 100 using the tracking module 208 (see FIG. 2). The tracking module 208 may conduct a relevancy match 1504 between the identification data 126 associated with the social object 124 and at least a portion of the content 1502 of the page 1500. Stated otherwise, the higher the relevancy match 1504 may be between the identification data 126 and the content 1502, the higher the probability the social object 124 may be associated with the page 1500.

FIG. 15 also shows the social object 124 being republished adjacent to the portion of the content 1502 of the page 1500, according to one embodiment. In one embodiment, once the social object 124 has been associated with the page 1500, the republishing module 210 may communicate with the processor 212 (see FIG. 2) to automatically republish the social object 124 adjacent to the content 1502 of the page 1500. This may involve embedding the social object 124 onto the page 1500, adjacent to at least a portion of the content 1502, in the curated content system 100.

FIG. 15 also shows how the page 1500 may be created. According to one embodiment, the different user 1512, with the social media account 1516 of the third-party service 1518 may create the page 1500 through a clipping action 1508 and/or a reposting action 1510 of the number of other social objects 1514 arranged in the page 1500. Aforementioned actions may include clipping the number of social objects 1514 from the number of disparate media sources 1202, 1204, 1206, and/or 1208 (e.g. the news site and/or the blog site) onto the page 1500 of the curated content system 100, and/or reposting 1510 the number of social objects 1516 from disparate pages within the curated content system 100 onto the page 1500, according to one embodiment. Stated differently, the page 1500 may be created by the different user 1512 by arranging the number of social objects 1516 from a number of other media sources 1202, 1204, 1206, and/or 1208 and/or from various pages within the curated content system 100 onto the page 1500 of the curated content system 100, according to one embodiment.

Figure 16:
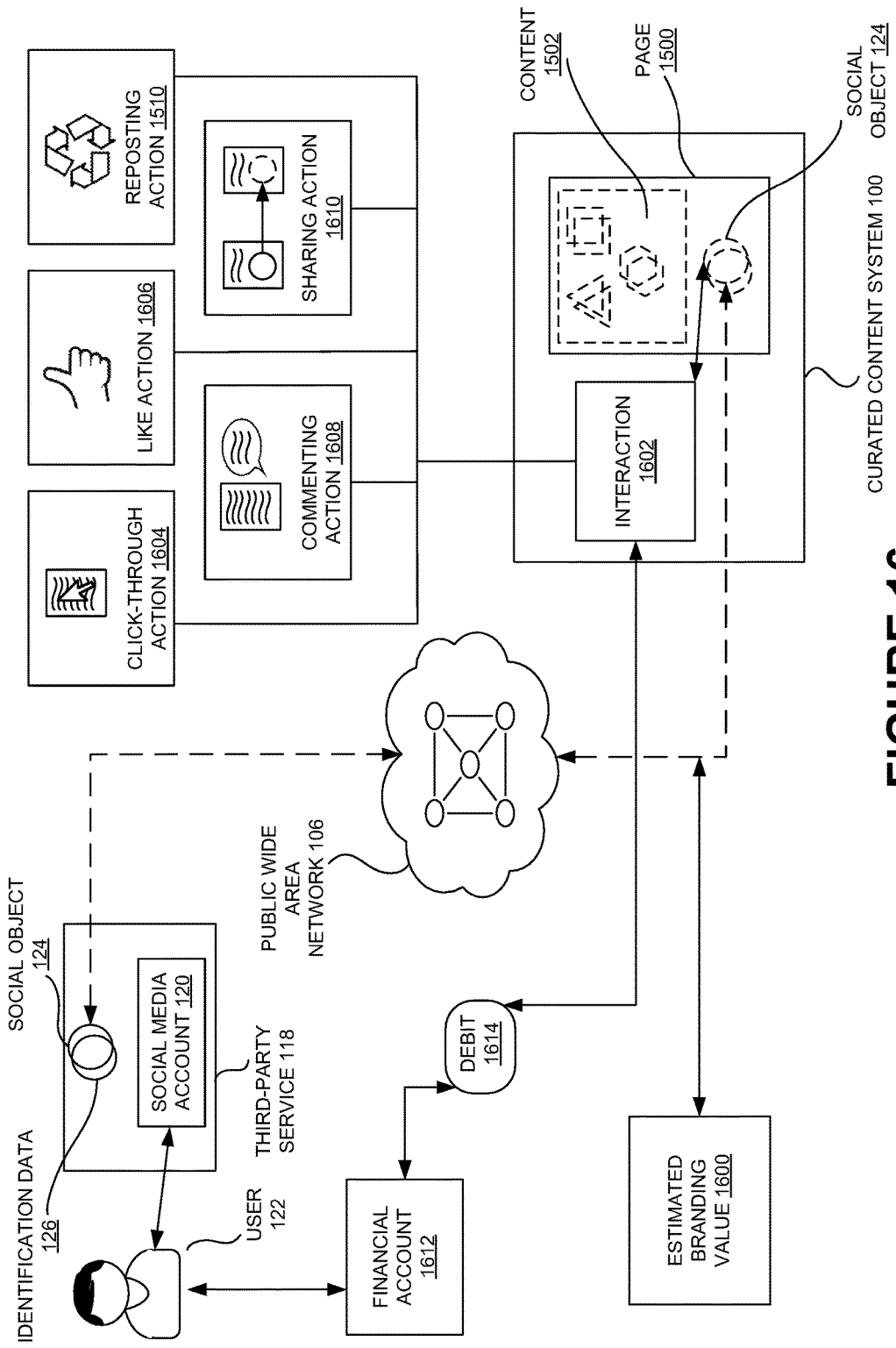
FIG. 16 is a schematic view of an interaction on the social object, according to one or more embodiments.

Reference is now made to FIG. 16, which shows the estimated branding value 1600 being calculated based on the republishing of the social object 124 adjacent to at least a portion of the content 1502 of the page 1500, according to one embodiment. FIG. 16 also shows an interaction 1602 on a republished social object 124 being measured, and a debit 1614 being applied to a financial account 1612 of the user 122.

According to one embodiment, the budget advertising module 222 (see FIG. 2) within the curated content system 100 may automatically calculate the estimated branding value 1600 of the social object 124 based on the republishing of the social object 124 onto the page 1500.

According to one embodiment, the interaction module 224 (see FIG. 2) may measure an interaction 1602 on the social object 124 adjacent to at least a portion of the content 1502 of the page 1500. The interaction 1602, according to FIG. 16, may be at least one of a click-through action 1604, a "like" action 1606, the reposting action 1510, a commenting action 1608, and/or a sharing action 1610, according to one embodiment. In various embodiments, the click-through action 1604 may be a simple click on the social object 124 so as to reveal a number of contents of the social object 124 in further detail. The "like" action 1606 may involve the clicking of a "like" icon on the social object 124 that may increase a cumulative "like" count which represents a total number of "like" actions 1606 from the number of users 122. It may be appreciated that the "like" action 1606 may be similar to a number of "like" features on a number of other media sources 702 (e.g. the Youtube® site and/or the Facebook® site). The reposting action 1510 may involve posting the number of other social objects 1514 to the page 1500 on which the social object 124 is republished, and/or posting the social object 124 onto another page 1702 of the curated content system 100. The commenting action 1608 may involve the user 122 submitting commentary through a pre-rendered text box associated with the social object 124, and adjacent to previously submitted commentary by a number of different users 1512, and within a predetermined character-limitation. The sharing action 1610 may involve sharing the social object 124, and/or an Internet link to the social object 124, to a disparate media source 702 (e.g. the Facebook® site, Reddit®, the Twitter® site). The social object 124 may include a series of icons corresponding to a number of media sources 702 adjacent to it, such that a click-through action 1604 on a number of the icons will share the social object 124 to a corresponding website (one of the media sources 702), according to one embodiment.

According to one embodiment, the finance module 226 may communicate with the interaction module 224 and the budget advertising module 222 (see FIG. 2) to debit 1614 a financial account 1612 associated with the user 122 based on the interaction 1602 measured by the interaction module 224. According to one embodiment, the amount debited to the financial account 1612 of the user 122 may depend on the estimated branding value 1600 assessed to the social object 124 based on the republishing of the social object 124 to the curated content system 100. Stated differently, a higher estimated branding value 1600 assessed to the social object 124 based on the republishing to the curated content system 100 may result in a higher debit 1614 charged to the financial account 1612 of the user 122. Conversely, a lower estimated branding value 1600 assessed to the social object 124 may result in a lower debit 1614 charged to the financial account 1612 of the user 122.

According to another embodiment, a higher rate of interaction 1602 may yield a higher rate debit 1614 to the financial account 1612 of the user 122. Stated differently, the financial account 1612 may debit 1614 at a higher rate if a high rate of interaction 1602 is measured. Conversely, if there is little interaction 1602 with the social object 124, a smaller debit 1614 may be applied to the financial account 1612 of the user 122. The debit 1614 to the financial account 1612 of the user 122 after each interaction 1602 may be based on the estimated branding value 1600. According to one or more embodiments, the estimated branding value 1600 may affect the debit 1614 to the financial account 1612 of the user 122, and the frequency of interactions 1602 on the social object 124 may affect the frequency with which the financial account 1612 of the user 122 is debited 1614.

Figure 17:
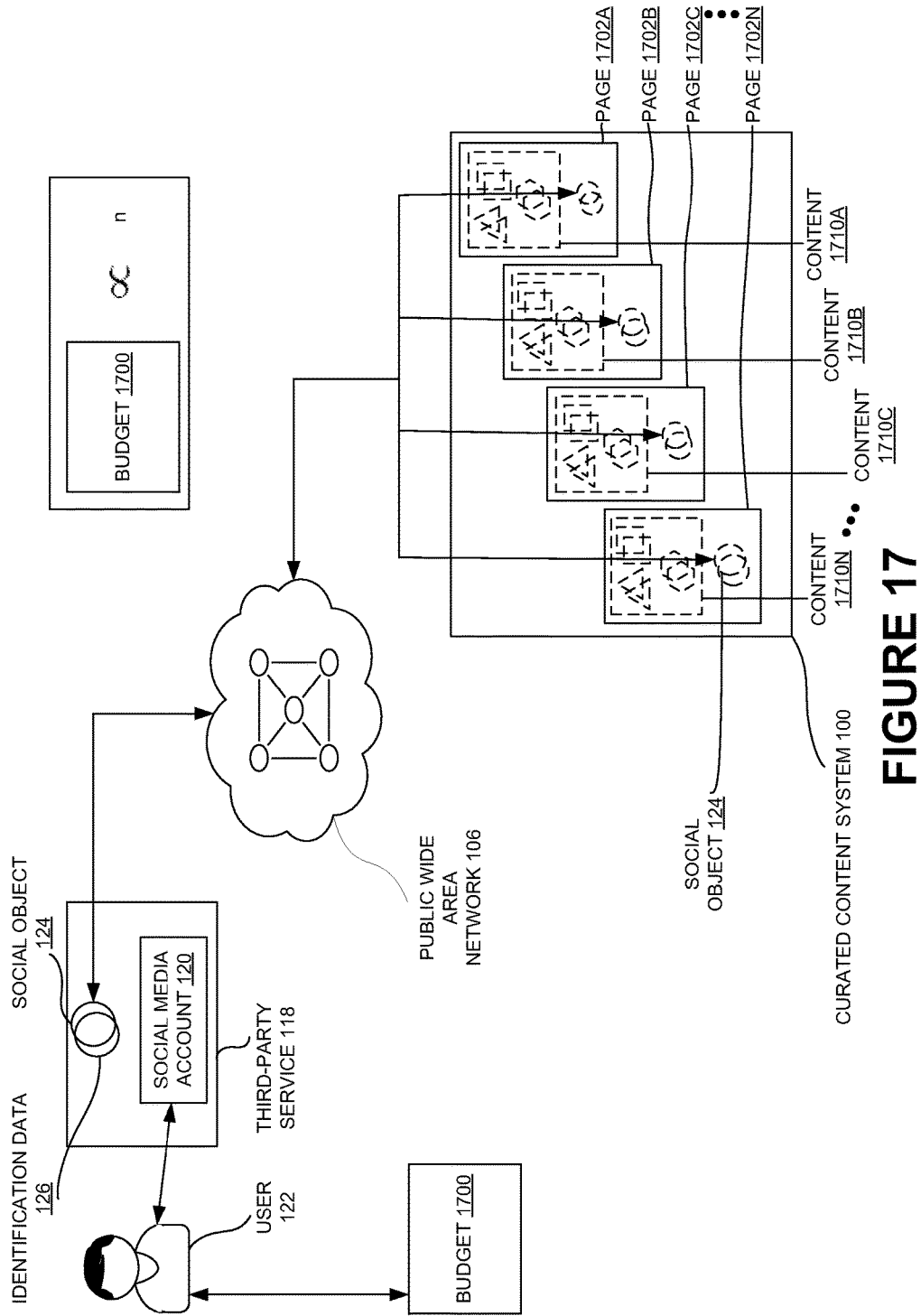
FIG. 17 is a schematic view of a budget of the user of a third-party service, according to one or more embodiments.

Reference is now made to FIG. 17 which shows the social object 124 being republished to a plurality of pages 1702A-N, wherein a number of pages n in which the social object 124 is republished is proportional to a budget 1700 of the user 122, in one embodiment.

According to one embodiment, the promotion module 228 may communicate with the tracking module 208, the republishing module 210, the processor 212, the budget advertising module 222, and/or the finance module 226 (see FIG. 2) to republish the social object 124 onto the plurality of pages 1702A-N, wherein the number of pages n to which the social object 124 is republished is proportional to the budget 1700 of the user 122. As described in previous embodiments, the tracking module 208 may associate the social object 124 to the page 1500 based on a relevancy match 1504 between the identification data 126 and at least the portion of the content 1502 of the page 1500. When communicating with the promotion module 228 to republish the social object 124 onto the plurality of pages 1702A-N, the tracking module 208 may need to associate the social object 124 to the plurality of pages 1702A-N. Stated otherwise, the tracking module 208 may need to perform a plurality of relevancy matches 1504 wherein the identification data 126 of the social object 124 may be matched to a content 1710A-N of the plurality of pages 1702A-N. Once the tracking module 208 has matched the social object 124 to the plurality of pages 1702A-N, the promotion module 228 may communicate with the republishing module 210 and the processor 212 to publish the social object 124 into the plurality of pages 1702A-N, wherein the number of pages n in which the social object 124 is republished is proportional to the budget 1700 of the user 122, according to one embodiment.

According to one embodiment, once the social object 124 has been republished onto the plurality of pages 1702A-N by the promotion module 228, the republishing module 210, and/or the processor 212, the budget advertising module 222 may calculate the estimated branding value 1600 based on each republishing to each of the plurality of pages 1702A-N, wherein the estimated branding value 1600 may be unique to the republishing on each of the plurality of pages 1702A-N. According to another embodiment, once the social object 124 has been republished into the plurality of pages 1702A-N, the interaction module 224 may measure an interaction 1602 on the social object 124 in each of the plurality of pages 1702A-N. The finance module 226 may debit 1614 the financial account 1612 of the user 122 based on the interaction 1602 on the social object 124 on each of the plurality of pages 1702A-N. Stated otherwise, the budget advertising module 222, the interaction module 224, and the finance module 226 may interact with the social object 124 on each of the plurality of pages 1702A-N within the curated content system 100, wherein the budget advertising module 222 calculates the estimated branding value 1600 based on each republishing of the social object 124 to each of the plurality of pages 1702A-N, the interaction module 224 measures the interaction 1602 on the social object 124 in each of the plurality of pages 1702A-N, and the finance module 226 debits 1614 the financial account 1612 of the user 122 based on each interaction 1602 on the social object 124 in each of the plurality of pages 1702A-N, according to one embodiment.

Figure 18:
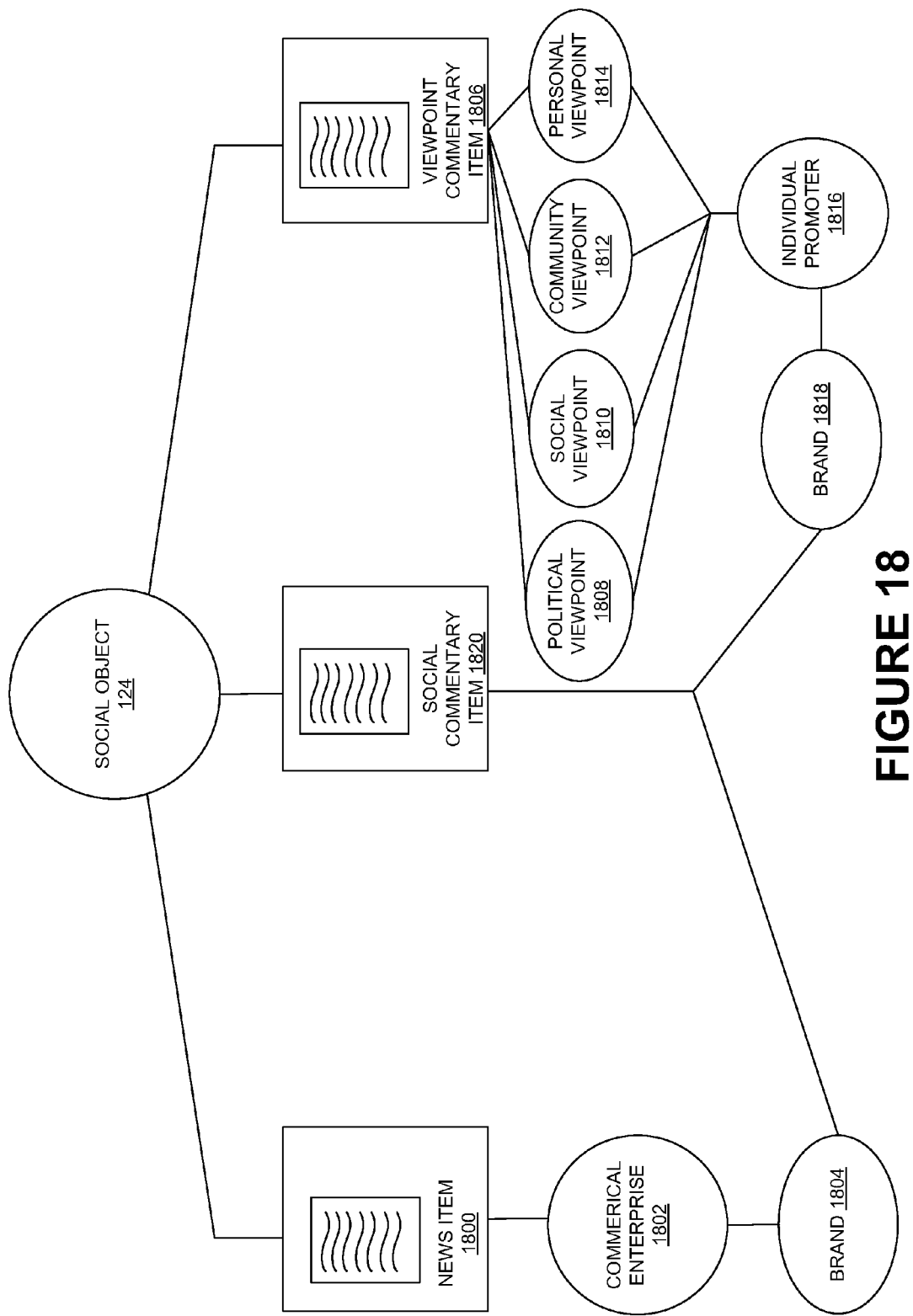
FIG. 18 is a schematic view of the social object, according to one or more embodiments.

Reference is now made to FIG. 18, which further describes a number of characteristics of the social object 124. According to one embodiment, the social object 124 may be a news item, 1800, a viewpoint commentary item 1806, and/or a social commentary item 1820. The news item 1800 may originate with a commercial enterprise 1802 that seeks to create awareness around a brand 1804. The viewpoint commentary item 1806 may be expressed by an individual promoter 1816. The individual promoter 1816 may be an advocate of a political viewpoint 1808, a social viewpoint 1810, a community viewpoint 1812, and/or a personal viewpoint 1814. The political viewpoint 1808 may be a commentary on any U.S. and/or international situation, issue, and/or phenomenon. Some examples are the Arab uprising, Syrian civil war, U.S. elections, gay rights, etc. The social viewpoint 1810 may be a commentary on any social situation, issue, and/or phenomenon. Some examples are pop-culture, fashion, health and living, art, etc. The community viewpoint 1812 may be a commentary on any community situation, issue, and/or phenomenon that may be specific to a community (e.g. a town, a city, a county, etc.). Some examples are an information and/or a discussion on local events, community forums, community concerns and issues, community politics, etc. The personal viewpoint 1814 may be a commentary that expresses the personal viewpoint 1814 of an individual promoter 1816. According to one embodiment, the social commentary item 1820 may be of the commercial enterprise 1802 and/or the individual promoter 1816 seeking to create awareness around the brand 1804 and a brand 1818 of the commercial enterprise 1802 and/or the individual promoter 1816, respectively.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits [e.g., application specific integrated (ASIC) circuitry and/or in Digital Signal Processor (DSP) circuitry].

Particularly, the tracking module 208, the notification module 214, and all of the remaining number of modules of FIGS. 1-18 may be enabled using software and/or using transistors, logic gates, and electrical circuits (e.g., ASIC) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Figure 6:
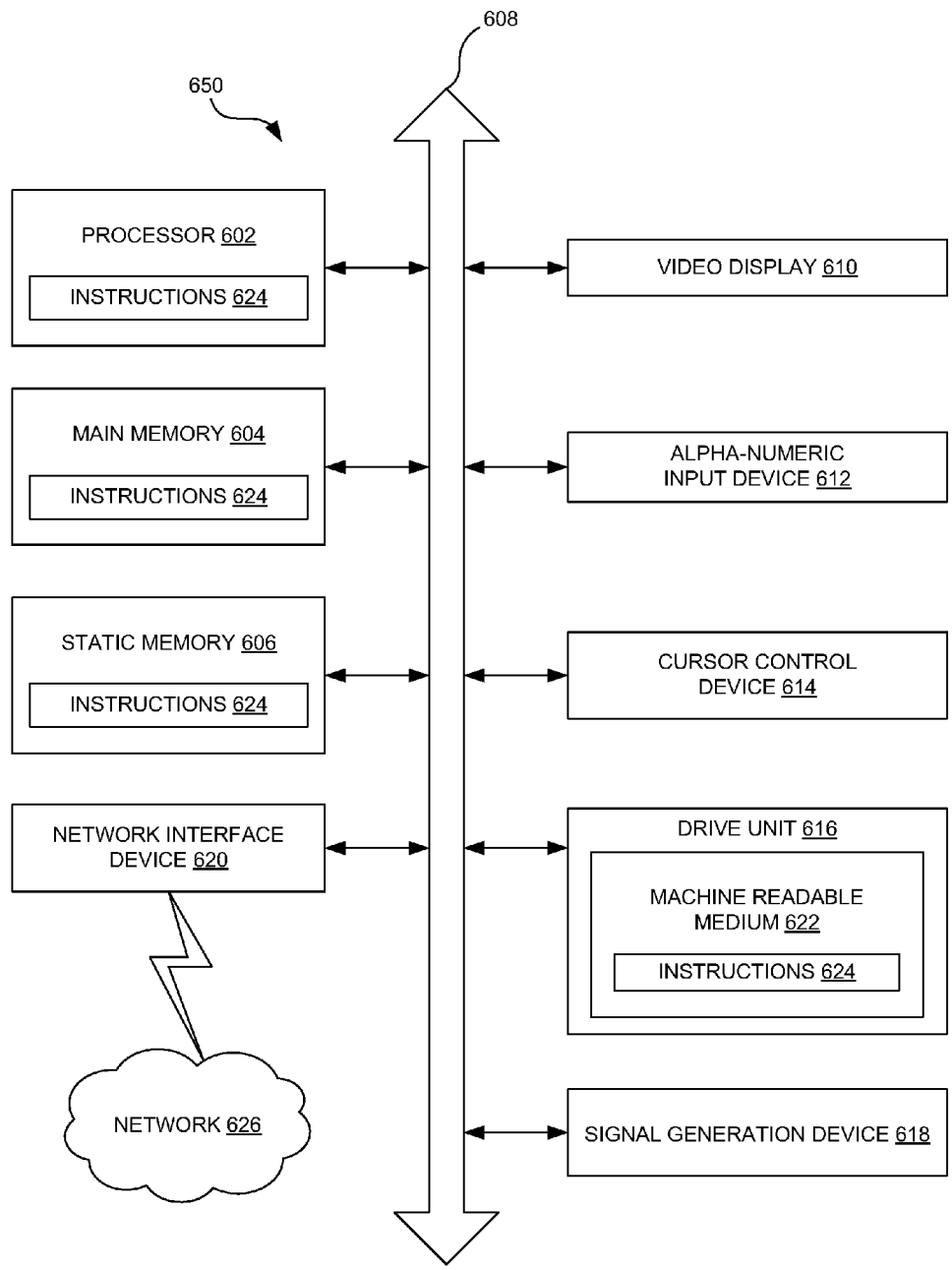
FIG. 6 is a schematic view of a data processing system, according to one or more embodiments.

FIG. 6 may indicate a personal computer and/or a data processing system in which one or more operations disclosed herein may be performed. The processor 602 (may be a microprocessor, a state machine, an application specific integrated circuit, a field programmable gate array, etc. Some examples are an Intel® Pentium® processor, 620 MHz ARM 1176, etc. The main memory 604 may be a dynamic random access memory and/or a primary memory of a computer system.

The static memory 606 may be a hard drive, a flash drive, and/or an other memory information associated with the data processing system. The bus 608 may be an interconnection between various circuits and/or structures of the data processing system. The video display 610 may provide a graphical representation of an information on the data processing system. The alpha-numeric input device 612 may be a keypad, a keyboard, a virtual keypad of a touchscreen and/or any other input device of text (e.g., a special device to aid the physically handicapped).

The cursor control device 614 may be a pointing device such as a mouse. The drive unit 616 may be the hard drive, a storage system, and/or other longer term storage subsystem. The signal generation device 618 may be a bios and/or a functional operating system of the data processing system. The network interface device 620 may be a device that performs interface functions such as code conversion, protocol conversion and/or buffering required for a communication 810 to and from the network 626. The machine readable medium 622 may provide instructions on which any of the methods disclosed herein may be performed. The instructions 624 may provide the source code and/or a data code to the processor 602 to enable any one or more operations disclosed herein.

In addition, it will be appreciated that the various operations, processes, and methods disclosed herein may be embodied in a machine-readable medium and/or a machine accessible medium compatible with the data processing system (e.g., a computer system), and may be performed in any order (e.g., including using means for achieving the various operations). Accordingly, the specification and drawings are to be regarded in an illustrative rather than a restrictive sense.

Furthermore, it will also be appreciated that the present invention may have utility for online publishing tasks, according to one or more embodiments. According to one embodiment, the original content 110 may be published and distributed via the Internet. Such online publishing may also be known as electronic publishing which may include the digital publication of the original content 110 and may also include the electronic publishing of e-books and electronic articles and the development of digital libraries and catalogues. According to one embodiment, a published information may be available for use over the number of computer networks (e.g., the public wide area network 106) and the published information may come from a number of other media sources (e.g., books and/or magazines) and may be designed specifically for computer delivery.

For example, Joe (based in New York City, United States) may want to publish an online news story about the current situation in Libya involving the unrest brought on by widespread anti-government protests. Joe may know and/or follow (on social media sources 702) several Libyan citizens (Ali and Ahmed for example) who may be armed with laptops and digital video cameras. Ali and Ahmed may use Twitter®, Facebook®, and/or any of the other media sources 702 to post status updates and feeds about the situation on the ground in Libya. They may also digitally record a situation on the ground that may, hypothetically speaking, involve women and children being abused by the military police. They may then post this video on YouTube® (reference media sources 702). Joe on the other hand, may want to use social media content created by both Ali and Ahmed to publish his own news story. Joe may want to use Ali and Ahmed as his "source" for the news story and may want to use their social media content to show how Joe's sources may be attributed to Ali and Ahmed for credibility.

In addition, Joe's news story (containing snippets of social media content created by Ali, Ahmed and other persons) may be picked up by other media and social media websites. Ali and Ahmed's social media content may be assigned a page rank 1308. If Ali's content (as incorporated by Joe in his news story) is re-used by other media websites and/or news organizations more often than Ahmed's social media content (based on a page rank 1308), Ali may be compensated financially through the financial account 1612 for being the primary source in Joe's story and for taking the risk to document atrocities that may be occurring on the ground in Libya. In addition, Ali's credibility 1306 as a primary source on the ground in Libya may be attributed and confirmed with identification meta-data 108 that is present in Ali's social media content. This identification meta-data 108 may provide real time information about the timeline of event, the location of event, date of the event, and other geographical indications (reference temporal data of subsequent publishers 302) that may add credibility 1306 and reliability to any of Ali's future social media content covering further events on the ground in Libya and/or elsewhere.

Joe on the other hand may not need to leave New York City in order to communicate and collaborate with Ali and Ahmed (as opposed to the traditional new gatherer who may have to fly to Libya and track down Ali and/or Ahmed in person). Ali and Ahmed may become regular contributors and sources to Joe's news stories. In addition, since Joe may have a copyright in his original online publication of original content 110, he may be compensated by other news organizations if they decide to re-publish Joe's story, while at the same time increasing the credibility 1306 and exposure of Ali, Joe's local collaborator on the ground in Libya. Ali may be considered the first publisher 114 of his original content 110 and Joe may be considered the subsequent publisher 116 of his news story (which may be called the "other work of authorship" 112). Re-publishing of Ali's original content multiple times by different organizations across different platforms may add to the credibility 1306 of Ali and Joe as reputable publishers and creators of original content 110. Such a source attribution (identifying Ali through identification meta-data 108) of embedded content 304 (Ali's on the ground information gathering posted on social media sources 702) may result in a collaborative and a powerful way in which social media sources 702 may be utilized to incentivize and drive online publication and at the same time may provide a way for publishers (online and/or otherwise) to harvest social media technologies to empower original content 110 and first publishers 114 across the world.

In another example, a user 122, John, may want to keep up-to-date and inform others on the 2012 Presidential election. He may create a page 1500 by aggregating a collection of social objects 124 (e.g., at least one of a news article, blog post, picture, video, etc.) that may provide news and/or opinions on the election, the candidates, and/or the issues. He may create this page 1500 by collecting these social objects 124 from various other media sources 702 (e.g., a news site, a blog site, Youtube®, Facebook®, Twitter®, etc.), and reposting 1510 them to a page 1500, wherein the content 1502 of the page 1500 may be the various social objects 124 (e.g., pictures, videos, articles, etc.) that he has collected. For example, he may post a video using the reposting action 1510 where one candidate voices his stance on a particular issue, a news article reporting one candidate's political gaffe, and/or a blog post criticizing one candidate over a particular speech he made.

Another user 122, Peter, a user of a disparate media source 702 (e.g., a news site and/or Facebook®), may have on that site his own social object 124 (e.g., a news article and/or a blog post). This social object 124 may also provide news and/or opinions on the 2012 Presidential election. If Peter's social media account 120 associated with that site is linked to the curated content system 100, the social object 124 may be automatically republished onto the page 1500 of the curated content system 100, if the social object 124 is relevant to the content 1502 of the page 1500. For example, once Peter's social media account 120 is linked to the curated content system 100, his news article, which may provide an individual's predictions on the outcome of the election, may be automatically republished onto the page 1500. Peter, as an individual and/or as a representative of a commercial enterprise, may have a particular disposition towards the election. For example, he may support one candidate over the other. He may also have a particular disposition towards a certain issue and/or policy. By republishing the social object 124 onto the page 1500, he seeks to raise awareness to his particular disposition. Peter may also have a particular brand that he seeks to promote, and may republish the social object 124 so as to raise awareness of the brand.

Peter's financial account 1612 may be debited 1614 depending on how many pages 1500 his social object 124 is republished, too. For example, there may be a plurality of pages 1702A-N discussing the candidates' stances on abortion. Peter's article, blog post, video, etc. relating his view and/or interest on the issue may be republished onto each of those pages 1702A-N, and his financial account 1612 debited 1614 accordingly.

Once Peter's social object 124 (e.g., article, blog post, video, etc.) is republished onto a page 1500, a plurality of different users 1512 may choose to interact with it. They may click-through 1604 on the social object 124 so as to view its content 1502, "like" 1606 the social object 124 in a manner similar to Facebook® and/or Youtube®, repost 1510 it to another page 1702A-N, comment 1608 on it, and/or share 1610 it to another website. Peter's financial account 1612 may be debited 1614 a particular dollar amount which is calculated according to a measurement of the various interactions.

As such, by promoting the social object 124 onto various pages 1702A-N, and by encouraging interaction with the social object 124, Peter seeks to raise awareness about the social object 124. For example, he may seek to raise awareness for his brand, to raise awareness for his opinion on a particular candidate of the election by republishing blog and/or opinion articles, and/or to raise awareness for a particular issue by republishing news, scientific, and/or academic articles about that issue.

Although the present embodiments have been described with reference to specific example embodiments, it will be evident that various modifications may be made to these embodiments without departing from the broader spirit and scope of the various embodiments. Also, for example, the various mobile devices described herein may not necessarily be inside a vehicle. Further, for example, the various devices and modules described herein may be enabled and operated using hardware circuitry, firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., computer devices), and may be performed in any order (e.g., including means for achieving the various operations). Accordingly, the specification and the drawings are regarded in an illustrative rather than a restrictive sense.

What is claimed is:

1. A method, performed by a computing device, for attributing credit to users who create social media posts that embed original content of others, the method comprising:
    publishing original content of a first publisher in a first publishing, the original content published with identification metadata identifying the first publisher;
    assessing a social media post published on a social media webpage that publishes posts from multiple users of a social media service, the social media post comprising the identification metadata of the original content;
    determining that the original content has been published in a second publishing as an embedded portion of the social media post based on identifying the identification metadata in the social media post;
    determining an identity of a user of the social media service who created the social media post by embedding the original content with textual, audio, video, or pictorial components to create the social media post;
    attributing creation of the social media post and embedding of the original content to the user based on the determining of the identity of the user who created the social media post, wherein the attributing comprises notifying the first publisher of the creation of the social media post embedding the original content and the identity of the user who created the social media post by embedding the original content,
    determining which original content is trusted in the social media service based on republishing history associated with the original content contributions of the first publisher and other first publishers, and which algorithmically presents preferred content to second publishers based on a criteria including a popularity of republishing of the original content and a credibility scoring of the first publisher and other first publishers that is determined based on an algorithmic page rank of republished destinations and originated sources of the original content,
    wherein the determination based on the algorithmic page rank of republished destinations and originated sources of the original content also considers a rating score assessed to original content and first publishers by second publishers who provide this rating score of original content and first publishers such that the second publishers have access privileges to access ratings and associated comments provided by peer second publishers.

2. The method of claim 1 further comprising notifying the first publisher of the second publishing of the original content and the identity of the user.

3. The method of claim 1 further comprising providing a financial incentive based on the original content having been republished in the second publishing.

4. The method of claim 2, wherein the financial incentive is proportional to at least one of an aggregate number of views, a unique visitor count, a bounce rate, a social sharing rate, and a commenting rate, associated with the original content having been republished in the second publishing.

5. The method of claim 1, wherein determining that the original content has been republished in the second publishing comprises monitoring a third-party source server for the original content having been republished in the second publishing.

6. A computer program product, the computer program product being tangibly embodied on a non-transitory machine readable medium and including instructions that, when executed by at least one processor, are configured to attribute credit to users who create social media posts that embed original content of others, the instructions being further configured to:
    publish original content of a first publisher in a first publishing, the original content published with identification metadata identifying the first publisher;
    assess a social media post published on a social media webpage that publishes posts from multiple users of a social media service, the social media post comprising the identification metadata of the original content;
    determine that the original content has been published in a second publishing as an embedded portion of the social media post based on identifying the identification metadata in the social media post;
    determine an identity of a user of the social media service who created the social media post by embedding the original content with textual, audio, video, or pictorial components to create the social media post;
    attribute creation of the social media post and embedding of the original content to the user based on the determining of the identity of the user who created the social media post, wherein the attributing comprises notifying the first publisher of the creation of the social media post embedding the original content and the identity of the user who created the social media post by embedding the original content,
    determine which original content is trusted in the social media service based on republishing history associated with the original content contributions of the first publisher and other first publishers, and which algorithmically presents preferred content to second publishers based on a criteria including a popularity of republishing of the original content and a credibility scoring of the first publisher and other first publishers that is determined based on an algorithmic page rank of republished destinations and originated sources of the original content,
    wherein the determination based on the algorithmic page rank of republished destinations and originated sources of the original content also considers a rating score assessed to original content and first publishers by second publishers who provide this rating score of original content and first publishers such that the second publishers have access privileges to access ratings and associated comments provided by peer second publishers.

7. The computer program product of claim 6, wherein the instructions, when executed, are further configured to notify the first publisher of the second publishing of the original content and the identity of the user.

8. The computer program product of claim 6, wherein the instructions, when executed, are further configured to provide a financial incentive based on the original content having been republished in the second publishing.

9. The computer program product of claim 8, wherein the financial incentive is proportional to at least one of an aggregate number of views, a unique visitor count, a bounce rate, a social sharing rate, and a commenting rate, associated with the original content having been republished in the second publishing.

10. The computer program product of claim 6, wherein the instructions, when executed to determine that the original content has been republished in the second publishing, are further configured to monitor a third-party source server for the original content having been republished in the second publishing.

* * * * *